(12) United States Patent
Futatsugi et al.

(10) Patent No.: US 8,908,794 B2
(45) Date of Patent: Dec. 9, 2014

(54) WIRELESS SENDING APPARATUS, WIRELESS SENDING METHOD, STORAGE MEDIUM AND BASEBAND CIRCUIT

(75) Inventors: Yasunori Futatsugi, Tokyo (JP); Masayuki Ariyoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 180 days.

(21) Appl. No.: 13/508,688

(22) PCT Filed: Nov. 2, 2010

(86) PCT No.: PCT/JP2010/069874
§ 371 (c)(1),
(2), (4) Date: May 8, 2012

(87) PCT Pub. No.: WO2011/055833
PCT Pub. Date: May 12, 2011

(65) Prior Publication Data
US 2012/0230449 A1 Sep. 13, 2012

(30) Foreign Application Priority Data

Nov. 9, 2009 (JP) ................................. 2009-255828

(51) Int. Cl.
*H04B 15/00* (2006.01)
*H04L 27/26* (2006.01)
*H04L 25/03* (2006.01)
*H04J 11/00* (2006.01)

(52) U.S. Cl.
CPC ...... *H04L 25/03343* (2013.01); *H04L 27/2626* (2013.01); *H04J 11/003* (2013.01)
USPC ........... 375/296; 375/259; 375/260; 375/285; 375/295

(58) Field of Classification Search
USPC .......................... 375/259, 260, 285, 295, 296
See application file for complete search history.

(56) References Cited

U.S. PATENT DOCUMENTS

2001/0009572 A1* 7/2001 Mochizuki .................... 375/296
2004/0062317 A1 4/2004 Uesugi et al.
(Continued)

FOREIGN PATENT DOCUMENTS

| CN | 1499753 A | 5/2004 |
|---|---|---|
| CN | 100544218 C | 9/2009 |

(Continued)

OTHER PUBLICATIONS

Office Action, dated Mar. 5, 2014, issued by the State Intellectual Property Office of the People's Republic of China, in counterpart Application No. 201080050834.3.

(Continued)

*Primary Examiner* — Siu Lee
(74) *Attorney, Agent, or Firm* — Sughrue Mion, PLLC

(57) ABSTRACT

A wireless sending apparatus with a change judging means to judge whether changing an interference causing avoiding transmission means on the basis of predetermined change judging information, and to output the judgment as a change judgment result; a signal separating means to separate the sending signal into each the group on the basis of the change judgment result; a first interference causing avoiding transmission means to input the sending signal which is separated into each the group, and to reduce leak power by a time-domain process; a second interference causing avoiding transmission means to input the sending signal which is separated into each the group, and to reduce the leak power by a frequency-domain process; and a synthesizing means to synthesize the sending signals which the first interference causing avoiding transmission means and the second interference causing avoiding transmission means carry out the interference causing avoiding process.

19 Claims, 22 Drawing Sheets

(56) References Cited

U.S. PATENT DOCUMENTS

| | | | |
|---|---|---|---|
| 2006/0138862 A1 | 6/2006 | Wakisaka et al. | |
| 2007/0218863 A1 | 9/2007 | Futatsugi et al. | |
| 2007/0230597 A1 | 10/2007 | Coon | |
| 2008/0002645 A1* | 1/2008 | Seki et al. | 370/338 |
| 2009/0140806 A1* | 6/2009 | Shako et al. | 330/149 |
| 2010/0104041 A1 | 4/2010 | Ibi et al. | |

FOREIGN PATENT DOCUMENTS

| | | |
|---|---|---|
| CN | 101622840 A | 1/2010 |
| EP | 1 842 297 A1 | 10/2007 |
| EP | 1940062 A1 | 7/2008 |
| EP | 2 129 020 A1 | 12/2009 |
| GB | 2 436 911 A | 10/2007 |
| JP | 2006-186733 A | 7/2006 |
| JP | 2007-282228 A | 10/2007 |
| JP | 2008-078790 A | 4/2008 |
| KR | 2009-117790 A | 11/2009 |
| WO | 2006/070916 A1 | 7/2006 |
| WO | 2008/105214 A1 | 9/2008 |
| WO | 2009/133816 A1 | 11/2009 |

OTHER PUBLICATIONS

Pagadarai, et al., "A Sub-optimal Sidelobe Suppression Technique for OFDM-based Cognitive Radios", IEEE Military Communications Conference, Nov. 19, 2008, 6 pages.

Brandes, et al., "Reduction of Out-of-Band Radiation in OFDM Based Overlay Systems", IEEE International Symposium, Nov. 11, 2005, pp. 662-665.

Poramate Tarasak, et al., "Further Enhancement for Active Interference Cancellation on MB-OFDM UWB Transmission," VTC, Fall 2008, pp. 1-5.

Hirohisa Yamaguchi, "Active Interference Cancellation Technique for MB-OFDM Cognitive Radio," 34th EMC, 2004, pp. 1105-1108.

Basuki E. Priyanto, et al., "A Spectrum Shaping Technique to Control Spectrum Emission of UTRA LTE User Equipment," NORCHIP, 2007, pp. 1-4.

Yasunori Futatsugi, et al., "A Study on Interference Suppression Technique by Partitioned Frequency- and Time-domain Processing for Dynamic Spectrum Access," IEICE Technical Report, May 2010, pp. 272-276, vol. 110, No. 41.

Communication dated May 13, 2014 from the Japanese Patent Office in counterpart Japanese Patent Application No. 2011539421.

Ruei-Syun Wang, et al., Low Complexity Design and Implementation of Active Interference Cancellation, Proceedings of the International Conference on Communications, Circuits and Systems, 2009. ICCCAS 20 Jul. 23, 2009, pp. 272-276.

C. Sahnine, et al., Towards a High-Throughput and Low Power Reconfigurable Architecture of Advanced OFDM Modulator for S, Proceedings of the IEEE Northeast Workshop on Circuits and Systems, 2007. NEWCAS 2007, Aug. 5, 2007, pp. 1205-1208.

Yasunori Futatsugi, et al., A Study on Interference Suppression Technique by Partitioned Frequency- and Time-domain Processing, IEICE Technical Report, May 2010, vol. 110, No. 41, SR2010-9, pp. 49-55.

* cited by examiner

Fig. 18

| INTERFERENCE CAUSING AVOIDING JUDGEMENT RESULT | MULTI-PATH DELAY JUDGEMENT RESULT | COMPREHENSIVE JUDGEMENT RESULT ON CHANGE | | | |
|---|---|---|---|---|---|
| | | PATTERN 1 | PATTERN 2 | PATTERN 3 | PATTERN 4 |
| OK | OK | TIME WINDOWING | TIME WINDOWING | TIME WINDOWING | TIME WINDOWING |
| OK | NG | AIC | TIME WINDOWING | AIC | TIME WINDOWING |
| NG | OK | AIC | AIC | TIME WINDOWING | TIME WINDOWING |
| NG | NG | AIC | AIC | AIC | AIC |

WIRELESS SENDING APPARATUS, WIRELESS SENDING METHOD, STORAGE MEDIUM AND BASEBAND CIRCUIT

CROSS REFERENCE TO RELATED APPLICATION

This application is a National Stage of International Application No. PCT/JP2010/069874 filed Nov. 2, 2010, claiming priority based on Japanese Patent Application No. 2009-255828 filed Nov. 9, 2009, the contents of all of which are incorporated herein by reference in their entirety.

TECHNICAL FIELD

The present invention relates to a wireless sending apparatus, a wireless sending method, a storage medium and a baseband circuit.

BACKGROUND ART

With regard to the next generation wireless communication system, there is a fear that the frequency resources will be exhausted due to the high speed transmission and the diversified system. In recent years, the cognitive radio method, which can carry out the most suitable communication autonomously through recognizing a surrounding wireless environment and user's needs, has been studied. The dynamic spectrum access of the cognitive radio method, by which a frequency band assigned to an existing wireless system can be used secondarily by another wireless system, receives much attention from a view point of the efficient use of the frequency resources. Specifically, according to the dynamic spectral access, a vacant frequency band within a frequency band assigned to a first system, which is the existing wireless system, is used by a second system, which is a new wireless system, without the second system disturbing communication of the first system.

FIG. 22 is a configuration diagram of a general communication system for describing the dynamic spectrum access. According to the communication system, an uplink or a downlink of the second system uses the same frequency band as an uplink or a downlink of the first system uses respectively.

A system shown in FIG. 22 includes a first system 2210 and a second system 2220. The first system 2210 includes a first system base station 2211, a first system mobile station 2212 and a first system mobile station 2213. The first system base station 2211 sends and receives data with the first system mobile station 2212 and the first system mobile station 2213.

The second system 2220 includes a second system base station 2221, a second system mobile station 2222 and a second system mobile station 2223. The second system base station 2221 sends and receives data with the second system mobile station 2222 and the second system mobile station 2223.

The standardized specification IEEE802.22 WRAN is exemplified as an example, which applies the dynamic spectral access, in addition to the example shown in FIG. 22. Here, IEEE is the abbreviation of Institute of Electrical and Electronic Engineers. Moreover, WRAN is the abbreviation of Wireless Regional Area Network. IEEE802.22 is the standardized specification in USA on the system in which the fixed wireless access system as the second system uses a vacant channel in the frequency band of the ground-wave broadcasting and the wireless microphone as the first system.

Next, an interference causing avoiding technology related to the dynamic spectrum access will be described. FIG. 23A and FIG. 23B are schematic diagrams describing a general interference causing avoiding transmission method. In FIG. 23A and FIG. 23B, the horizontal axis indicates frequency and the vertical axis indicates power density. That is, FIG. 23A and FIG. 23B indicate a frequency band which the first system uses, and a spectrum which the second system has. FIG. 23A show an image of the spectrum to which the interference causing avoiding technology has not been applied yet. FIG. 23B shows an image of the spectrum to which the interference causing avoiding technology has been applied.

As a principle, it is necessary that the second system communicate without disturbing communication of the first system. Therefore, it is necessary that the second system sends data, which has a spectrum 2302-1 and a spectrum 2302-2, with avoiding to cause an interference to frequency bands 2301-1, 2301-2 and 2301-3 which the first system uses. However, as shown in FIG. 23A, the actual sending spectrum includes leak power which leaks outside a sending frequency band. Therefore, there is a fear that a partial spectrum of the second system will cause interference to the first system. Here, it is possible to avoid the interference to the first system through arranging a guard frequency band which makes a distance far enough from the frequency band which the first system uses. However, in the case that the enough guard frequency band is arranged, there is another fear that efficiency of using the frequency band will be degraded.

As it is clear from the above description, in the cognitive radio method which makes it possible that a plurality of systems share the identical frequency band, it is important that the second system sends data without degrading efficiency of using the frequency band of the second system and with avoiding the interference to the first system from being caused. In particular, in the case that the second system adopts a wireless access method based on OFDM, some kind of measure of avoiding the interference from being caused is needed since the leak power, which leaks outside the frequency band, becomes large due to the side lobe component of the subcarrier. Here, OFDM is the abbreviation of Orthogonal Frequency Division Multiplexing.

As an interference causing avoiding transmission method which avoids the interference from being caused in the first system, the digital filter method, the null regeneration method, the gauss type multi-carrier method, the subcarrier weighting method, the Time windowing method and the AIC method are exemplified. Here, AIC is the abbreviation of Active Interference Cancellation. According to the digital filter method, the spectrum is shaped by use of a FIR (Finite Impulse Response) filter or an IIR (Infinite Impulse Response) filter. According to the null regeneration method, FFT (Fast Fourier Transform) is carried out after a plurality of OFDM symbols are combined, and IFFT (Inverse Fast Fourier Transform) is carried out after the null subcarrier replacement. The gauss type multi-carrier system is a multi-carrier transmission method with which a spectrum is shaped in a gauss pulse. According to the subcarrier weighting method, each symbol, which is converted into a subcarrier signal, is weighted. According to the Time windowing method, an OFDM symbol is shaped in the time domain. According to the AIC method, a tone is generated in order to cancel a component which leaks outside the frequency band. The Time windowing method and the AIC method out of these methods have good compatibility with the commercialized existing wireless system, and have suitableness for restraining dynamically the in-band interference and the out-band interference from being caused in response to an surrounding wireless environment. Hereinafter, the Time windowing method and the AIC method will be described.

According to the Time windowing method which is disclosed in the non-patent document 1, the OFDM symbol is shaped into a raised cosine roll off waveform or the like at a sending end. As a result, it is possible to reduce discontinuity between the OFDM symbols and to make the side lobe component of the subcarrier small. The Time windowing method has a feature that it is possible to reduce power, which exists outside the frequency band, with a simple configuration.

FIG. 24 is a block diagram of a wireless sending apparatus which is disclosed in the patent document 1 and which reduces the power, which exists outside the frequency band, with the Time windowing method. This wireless sending apparatus includes a data mapping unit 2401, IFFT units 2402-1, 2402-2 and 2402-3, CP adding units 2403-1, 2403-2 and 2403-3, wave form shaping units 2404-1, 2404-2 and 2404-3, an adding unit 2405, a digital-to-analog conversion unit 2406 and an analog unit 2407. According to the patent document 1, a plurality of subcarriers are divided into modulation groups, and IFFT and the CP addition are carried out for each modulation group. Furthermore, each modulation group is multiplied with a waveform characteristic whose degree in the waveform shaping is different for each modulation group, and afterward the modulation group signals are added. As a result, it is possible to reduce the power which exists outside the frequency band of the modulation group of the second system near the frequency band used by the first system, and consequently it is possible to restrain the interference from being caused.

FIG. 25 is a schematic diagram describing an operation of the AIC method disclosed in the non-patent documents 2 and 3. FIG. 25, whose horizontal axis indicates frequency and the vertical axis indicates power density, shows that the second system sends spectra 2502-1 and 2502-2 on both sides of a frequency band 2501 which is used by the first system. The AIC method reduces the power, which exists outside the frequency band of the second system, through arranging dedicated tones 2503-1 and 2503-2 for cancelling a leak component of the second system's spectrum which leaks inside the frequency band used by the first system. A case that two AIC tones are arranged outside the frequency band 2501 which is used by the first system is exemplified in FIG. 25. The AIC method has a feature that it is possible to form a notch whose depth is about −30 dB to −100 dB, and consequently it is possible to reduce significantly the power which exists outside the frequency band.

THE PRECEDING TECHNICAL DOCUMENT

Patent Document

[Patent document 1] Japanese Patent Application Laid-Open No. 2008-78790

Non-Patent Document

[Non-patent document 1] B. E. Priyanto, T. B. Sorensen, O. K. Jensen, T. Larsen, T. Kolding and P. Mogensen, "A spectrum shaping technique to control spectrum emission of UTRA LTE user equipment," NORCHIP, 2007.

[Non-patent document 2] H. Yamaguchi, "Active interference cancellation technique for MB-OFDM cognitive radio," 34th EMC, 2004.

[Non-patent document 3] P. Tarasak, F. Chin, Z. Lin and X. Peng, "Further enhancement for active interference cancellation on MB-OFDM UWB transmission," VTC 2008-Fall, 2008.

BRIEF SUMMARY OF THE INVENTION

A Problem to be Solved by the Invention

Firstly, a problem of the Time windowing method, which is disclosed in the non-patent document 1, will be described. According to the Time windowing method which is disclosed in the non-patent document 1, the depth of the notch, which is formed in order to reduce the power existing outside the frequency band, is not so large, that is, as large as about −20 dB to −50 dB. Particularly, in the case that bandwidth which the second system does not use for sending data is narrow, the notch with enough depth can not be formed. For this reason, there is a problem that, in the case that the frequency band which the first system uses, and the frequency band which the second system uses are arranged near each other, it is impossible to obtain an interference causing avoiding effect thoroughly. Moreover, according to the Time windowing method, an effective CP (Cyclic Prefix) length is invaded since the OFDM symbol is sent with being shaped so as to overlap partially with a preceding OFDM symbol and a following OFDM symbol. Accordingly, under an environment of a long multi-path delay of a transmission line, there is a fear that the preceding OFDM symbol will exceed the effective CP length to cause interference between the carriers, and interference between the symbols, and consequently substantial degradation of the transmission characteristic is caused.

Secondly, a problem of the Time windowing method, which is disclosed in the patent document 1, will be described. According to the patent document 1, number of sending levels of the symbol of the modulation group near to the frequency band, which the first system uses and in which the second system is prohibited to send data, is set small, and a waveform whose degree in the waveform shaping is strong is used in the Time window method. As a result, regarding the modulation group which exists near the frequency band used by the first system and whose number of the sending levels of the symbol is set small, degradation of the characteristic of the modulation group due to degradation of modulation accuracy can be reduced, and the leak power outside the frequency band can be reduced. However, since the interference between the carriers and the interference between the symbols are caused under the environment of the long multi-path delay of the transmission line even if the number of the sending levels of the symbol is set small, it is impossible to avoid the degradation of the characteristic. Particularly, in the case that a system, which adopts the variable sending-bandwidth transmission method, uses a transmission mode whose sending bandwidth is narrow, a sampling rate becomes low and CP sampling number becomes small. In the case that the waveform shaping is carried out with the Time window method under this condition, degradation of the characteristic becomes severe since the effective CP length decreases remarkably.

Thirdly, a problem of the AIC method, which is disclosed in the non-patent documents 2 and 3, will be described. According to the AIC method, a matrix multiplication, which includes an inverse matrix calculation, is needed when a symbol is generated to cancel the leak power, which exists outside the frequency band, just before carrying out IFFT. As a result, there is a problem that number of the calculations is large. Specifically, number of the calculations becomes large as number of the frequency bands, in which the interference should be avoided from being caused, becomes large. Particularly, in the case of a system or a transmission line environment in which the frequency band used by the first system changes dynamically, a position of the frequency band and a frequency bandwidth, in which the interference should be avoided, changes. For this reason, it is necessary to carry out frequently the matrix multiplication which includes the inverse matrix calculation, and consequently number of the calculations becomes large remarkably. Furthermore, there is another problem that the first system suffers from the interference through a tracking capability of the interference causing avoiding control being damaged due to the increase of the calculations.

Fourthly, a problem, which is caused in the case that any one of the Time windowing method and the AIC method is applied to each user in a system accommodating a plurality of users, will be described in the following. For example, in the case that the Time windowing method is applied to all users who share the same frequency band in a cellular system whose sending power is large relatively and in which a position of a wireless communication terminal changes, the interference causing avoiding performance may not be obtained thoroughly in some cases. Accordingly, an user, who is influenced by the long multi-path, is obliged to suffer from degradation of the characteristic. On the other hand, in the case that the AIC method is applied to all users, number of the calculation becomes enormous since it is necessary to carry out the matrix multiplication which includes the inverse matrix calculation. Accordingly, there is a fear that electric power consumption will become large, and simultaneously a fatal problem that the tracking capability of the interference causing avoiding control is damaged is caused.

In the case that any one of the Time windowing method and the AIC method is applied uniformly to all users as mentioned above, there is a problem that the interface causing avoiding performance, the transmission characteristic and the number of the calculations required for avoiding the interference from being caused are not always optimized.

The present invention is conceived to solve the above-mentioned problem. An object of the present invention is to provide a wireless sending apparatus, a wireless sending method, a storage medium, and a baseband circuit which are able to optimize the interference causing avoiding performance, the transmission characteristic and the number of calculations which are required for avoiding the interference from being caused.

Means to Solve the Problem

In order to solve the problem, a wireless sending apparatus according to the present invention includes: a change judging means to judge whether changing an interference causing avoiding transmission means, which is applied to each predetermined frequency-domain group of a sending signal, on the basis of predetermined change judging information, and to output the judgement as a change judgement result; a signal separating means to separate the sending signal into each the group on the basis of the change judgement result; a first interference causing avoiding transmission means to input the sending signal which is separated into each the group, and to reduce leak power, which leaks outside a sending frequency band, by a time-domain process; a second interference causing avoiding transmission means to input the sending signal which is separated into each the group, and to reduce the leak power, which leaks outside the sending frequency band, by a frequency-domain process; and a synthesizing means to synthesizes the sending signals which the first interference causing avoiding transmission means and the second interference causing avoiding transmission means carry out the interference causing avoiding process to respectively and supply respectively. Then, the sending signal is sent per the group by use of any one of the first interference causing avoiding transmission means and the second interference causing avoiding transmission means.

Moreover, a wireless sending method according to the present invention includes: a change judging step to judge whether changing an interference causing avoiding transmission step, which is applied to each predetermined frequency-domain group of a sending signal, on the basis of predetermined change judging information, and to output the judgement as a change judgement result; a separating step to separate the sending signal into each the group on the basis of the change judgement result; a first interference causing avoiding transmission step to input the sending signal which is separated into each the group, and to reduce leak power, which leaks outside a sending frequency band, by a time-domain process; a second interference causing avoiding transmission step to input the sending signal which is separated into each the group, and reduces the leak power, which leaks outside the sending frequency band, by a frequency-domain process; and a synthesizing step to synthesize the sending signals which the first interference causing avoiding transmission step and the second interference causing avoiding transmission step carry out the interference causing avoiding process to respectively and supply respectively. Then, the sending signal is sent per the group by use of any one of the first interference causing avoiding transmission step and the second interference causing avoiding transmission step.

Moreover, a storage medium according to the present invention stores a control program for making a computer of a wireless sending apparatus execute: a change judging process to judge whether changing an interference causing avoiding transmission process, which is applied to each predetermined frequency-domain group of a sending signal, on the basis of predetermined change judging information, and to output the judgement as a change judgement result; a separating process to separate the sending signal into each the group on the basis of the change judgement result; a first interference causing avoiding transmission process to input the sending signal which is separated into each the group, and to reduce leak power, which leaks outside a sending frequency band, by a time-domain process; a second interference causing avoiding transmission process to input the sending signal which is separated into each the group, and to reduce the leak power, which leaks outside the sending frequency band, by a frequency-domain process; a synthesizing process to synthesize the sending signals to which the first interference causing avoiding process and the second interference avoiding process are carried out respectively; and a sending process to send the sending signal per the group by use of any one of the first interference avoiding transmission process and the second interference avoiding transmission process.

Moreover, a baseband circuit according to the present invention includes: a change judging circuit to judge whether changing an interference causing avoiding transmission circuit, which is applied to each predetermined frequency-domain group of a sending signal, on the basis of predetermined change judging information, and to output the judgement as a change judgement result; a signal separating circuit to separate the sending signal into each the group on the basis of the change judgement result; a first interference causing avoiding transmission circuit to input the sending signal which is separated into each the group, and to reduce leak power, which leaks outside a sending frequency band, by a time-domain process; a second interference causing avoiding transmission circuit to input the sending signal which is separated into each the group, and to reduce the leak power, which leaks outside the sending frequency band, by a frequency-domain process; and a synthesizing circuit to synthesizes the sending signals which the first interference causing avoiding transmission circuit and the second interference causing avoiding transmission circuit carry out the interference causing avoiding process to respectively and supply respectively. Then, the sending signal is sent per the group by use of any one of the first interference causing avoiding transmission circuit and the second interference causing avoiding transmission circuit.

Effect of the Invention

According to the present invention, it is possible to optimize the interference causing avoiding performance, the transmission characteristic and the number of calculations.

BRIEF DESCRIPTION OF THE DRAWINGS

FIG. 14 is a sequence chart describing a procedure in which a sending destination apparatus of the second system measures the multi-path delay of the second system.

FIG. 16 is a sequence chart showing a procedure in which a sending source apparatus of the second system measures the multi-path delay of the second system.

[FIG. 18] is a schematic diagram showing a Time windowing/AIC changing comprehensive-judgement table based on an interference causing avoiding judgement result and a multi-path delay judgement result in relation to a comprehensive-judging process on Timing windowing/AIC shown in FIG. 11.

EXEMPLARY EMBODIMENT TO CARRY OUT THE INVENTION

In each exemplary embodiment of the present invention described in the following, it is assumed that a system, which accommodates a plurality of users, adopts the FDMA (Frequency Division Multiple Access) method which multiplexes signals of a plurality of users on the frequency axis. Hereinafter, a case that each exemplary embodiment is applied to a second system is exemplified.

[First Exemplary Embodiment]

Figure 1:
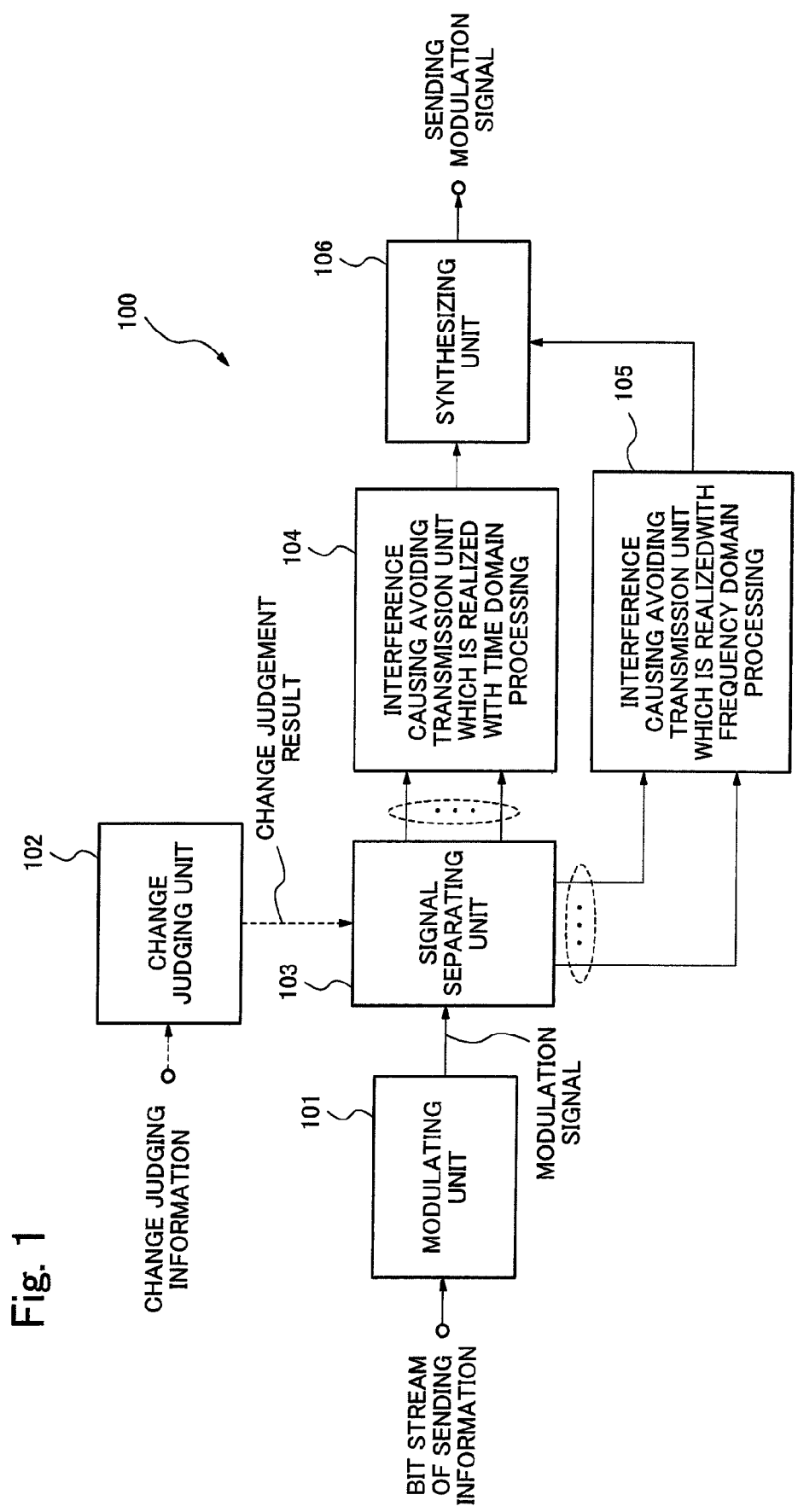
[FIG. 1] is a block diagram showing an exemplary configuration of a baseband unit, which is included in a wireless sending apparatus according to a first exemplary embodiment of the present invention and which is processed by the digital processing.

FIG. 1 is a block diagram showing an exemplary configuration of a baseband unit 100, which is included in a wireless sending apparatus according to a first exemplary embodiment of the present invention and which is processed by the digital processing. The baseband unit 100 includes a modulating unit 101, a change judging unit 102 (change judging means/ change judging circuit) and a signal separating unit 103 (signal separating means/signal separating circuit). Furthermore, the baseband unit 100 includes an interference causing avoiding transmission unit 104 (first interference causing avoiding transmission means/first interference causing avoiding transmission circuit) which is processed in the time domain, an interference causing avoiding transmission unit 105 (second interference causing avoiding transmission means/second interference causing avoiding transmission circuit) which is processed in the frequency domain, and a synthesizing unit 106 (synthesizing means/synthesizing circuit).

The modulating unit 101 inputs a bit stream of sending information, and carries out a modulation process of mapping the bit stream into a symbol stream, and sends the modulated signal (hereinafter, denoted as a modulation signal) to the signal separating unit 103.

With reference to predetermined "change judging information", the change judging unit 102 judges per a predetermined frequency-domain group whether the modulation signal is transmitted through the interference causing avoiding transmission unit 104 which is processed in the time domain, or through the interference causing avoiding transmission unit 105 which is processed in the frequency domain. The change judging unit 102 outputs the judgement result to the signal separating unit 103 as a "change judgement result". Here, as the change judging information, interference causing avoiding requiring information which indicates a required degree of avoiding interference from being caused, or multi-path delay information which indicates a degree of a multi-path delay of a transmission line is exemplified. In this case, it is possible to use any one or both of the interference causing avoiding requiring information and the multi-path delay information as the change judging information. That is, the change judging unit 102 can carry out the judgement on the change with reference to any one or both of the interference causing avoiding requiring information and the multi-path delay information.

The signal separating unit 103 inputs the modulation signal which is provided by the modulating unit 101, and the change judgement result which is provided by the change judging unit 102, and separates the modulation signal into each frequency-domain group on the basis of the change judgement result. The signal separating unit 103 outputs the modulation signal, which is separated into each the group, to the interference causing avoiding transmission unit 104 which is processed in the time domain or the interference causing avoiding transmission unit 105 which is processed in the frequency domain.

The interference causing avoiding transmission unit 104, which is processed in the time domain, inputs the modulation signal which is separated into each the frequency-domain group and which is provided by the signal separating unit 103, and carries out an interference causing avoiding transmission process in the time domain. For example, the Time windowing method is applied to the interference causing avoiding transmission process which is carried out in the time domain. The interference causing avoiding transmission unit 104 outputs the signal, to which the interference causing avoiding transmission process is carried out, to the synthesizing unit 106.

The interference causing avoiding transmission unit 105, which is processed in the frequency domain, inputs the modulation signal which is separated into each the frequency-domain group and which is provided by the signal separating unit 103, and carries out the interference causing avoiding transmission process in the frequency domain. For example, the AIC method is applied to the interference causing avoiding transmission process which is carried out in the frequency domain. The interference causing avoiding transmission unit 105 outputs the signal, to which the interference causing avoiding transmission process is carried out, to the synthesizing unit 106.

The synthesizing unit 106 inputs the signal to which the interference causing avoiding transmission means 104 carries out the interference causing avoiding transmission process in the time domain and which the interference causing avoiding transmission means 104 outputs, and the signal to which the interference causing avoiding transmission means 105 carries out the interference causing avoiding transmission process in the frequency domain and which the interference causing avoiding transmission means 105 outputs, and synthesizes both signals. The synthesizing unit 106 outputs the synthesized signal as a sending modulation signal.

Figure 2:
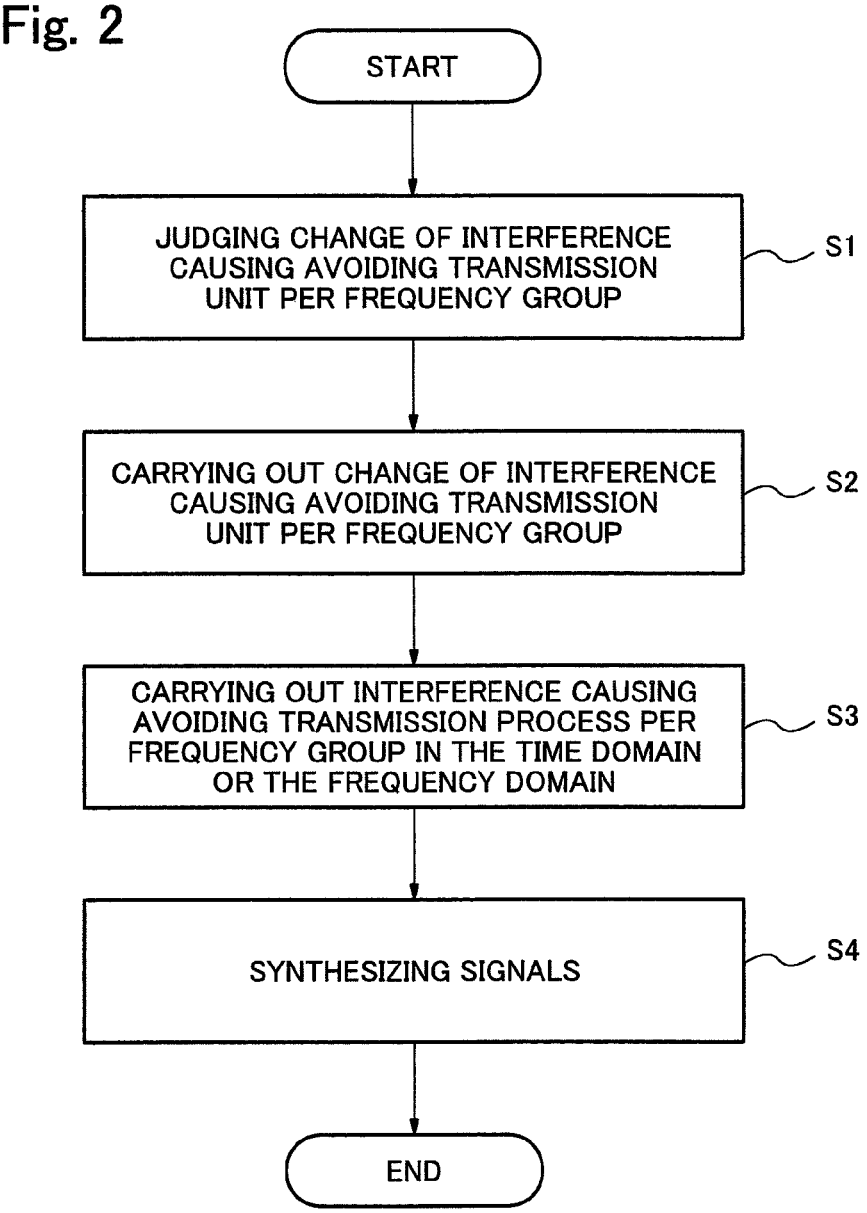
[FIG. 2] is a flowchart describing an example of an operation of the baseband unit shown in FIG. 1.

FIG. 2 is a flowchart showing an example of an operation of the baseband unit 100 shown in FIG. 1. With reference to the change judging information, the change judging unit 102 judges per the predetermined frequency-domain group whether the modulation signal is transmitted through the interference causing avoiding transmission unit 104 which is processed in the time domain, or through the interference causing avoiding transmission unit 105 which is processed in the frequency domain (Step S1).

The signal separating unit 103 inputs the modulation signal which is provided by the modulating unit 101, and the change judgement result which is provided by the change judging unit 102. The signal separating unit 103 separates the modulation signal into each the frequency-domain group on the basis of the change judgement result, and outputs the modulation signal, which is separated into each the group, to the interference causing avoiding transmission unit 104 or the interference causing avoiding transmission unit 105 (Step S2).

The interference causing avoiding transmission means 104 and the interference causing avoiding transmission means 105 input the modulation signal which is separated into each the frequency-domain group and is provided by the signal separating unit 103, and carry out respectively the interference causing avoiding transmission processes which have different performance each other (Step S3). The interference causing avoiding transmission means 104 and the interference causing avoiding transmission means 105 output respectively the modulation signals, to which the interference causing avoiding transmission process is carried out, to the synthesizing unit 106.

The synthesizing unit 106 inputs the modulation signals which the interference causing avoiding transmission means 104 and the interference causing avoiding transmission means 105 carry out the interference causing avoiding transmission process to respectively and output respectively, and the synthesizing unit 106 synthesizes both the signals (Step S4). The synthesizing unit 106 outputs the synthesized signal as the sending modulation signal.

Figure 3:
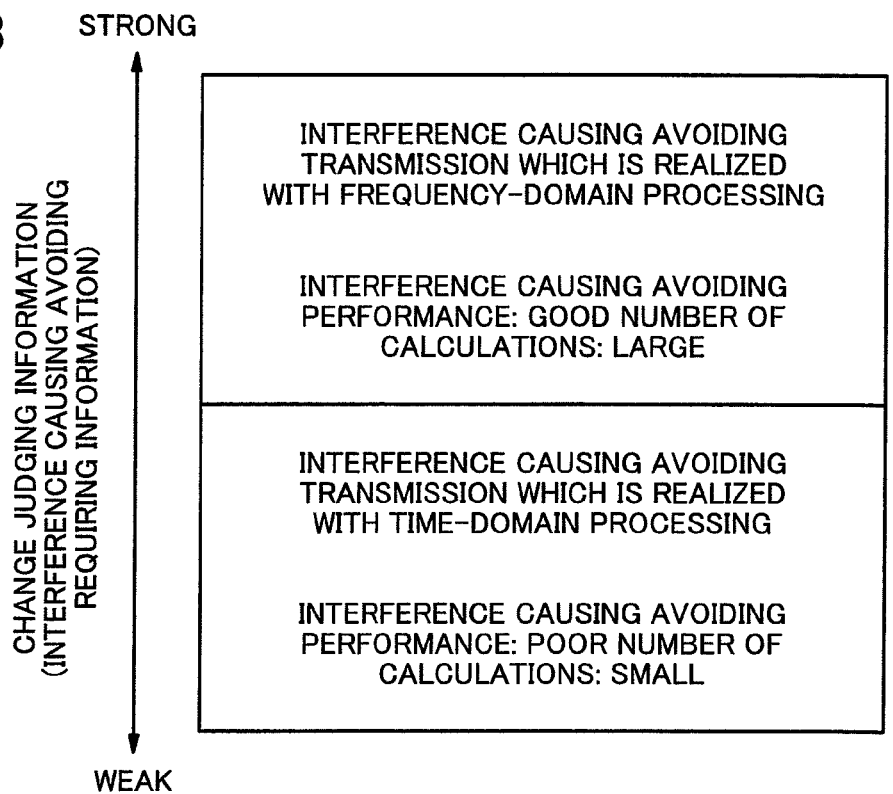
[FIG. 3] shows an example of an operation result which is obtained by the baseband unit in FIG. 1 in the case that change judging information is "interference causing avoiding requiring information".

FIG. 3 shows an example of an operation result which is obtained by the baseband unit 100 in the case that the change judging information is the "interference causing avoiding requiring information". As understood by FIG. 3, in the case that the interference causing avoiding requirement is "weak", the baseband unit 100 selects the interference causing avoiding transmission which is processed in the time domain and which has a poor interference causing avoiding performance but requires small number of the calculations. On the other hand, in the case that the interference causing avoiding requirement is "strong", the baseband unit 100 selects the interference causing avoiding transmission which is processed in the frequency domain and which has a good interference causing avoiding performance but requires large number of the calculations.

Figure 4:
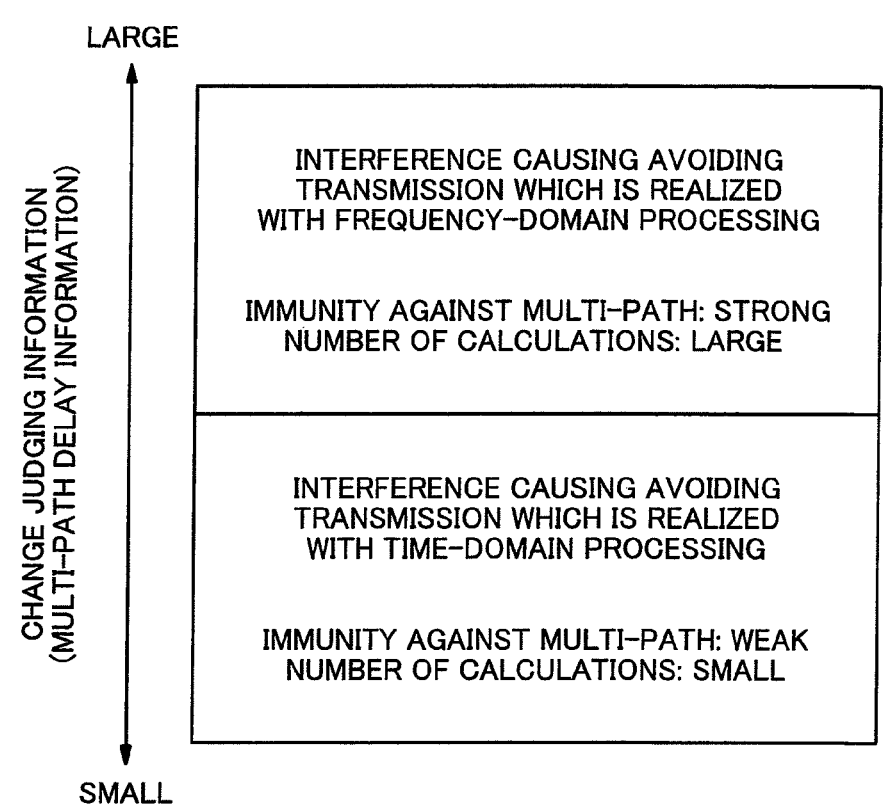
[FIG. 4] shows an example of an operation result which is obtained by the baseband unit in FIG. 1 in the case that the change judging information is "multi-path delay information of a transmission line".

FIG. 4 shows an example of an operation result which is obtained by the baseband unit 100 in the case that the change judging information is the "multi-path delay information of the transmission line". As understood by FIG. 4, in the case that the multi-path delay is "short", the baseband unit 100 selects the interference causing avoiding transmission which is processed in the time domain and which has weak immunity against the multi-path but requires small number of the calculations. On the other hand, in the case that the multi-path delay is "long", the baseband unit 100 selects the interference causing avoiding transmission which is processed in the frequency domain and which has strong immunity against the multi-path but requires large number of the calculations.

According to the first exemplary embodiment, it is possible to optimize the interference causing avoiding performance, the transmission characteristic and the number of the calculations required for avoiding the interference from being caused, which are required per the frequency-domain group of the sending signal. For example, in the case that the frequency-domain group is assigned per the user, it is possible to optimize the interference causing avoiding performance, the transmission characteristic and the number of the calculation per the user.

[Second Exemplary Embodiment]

Figure 5:
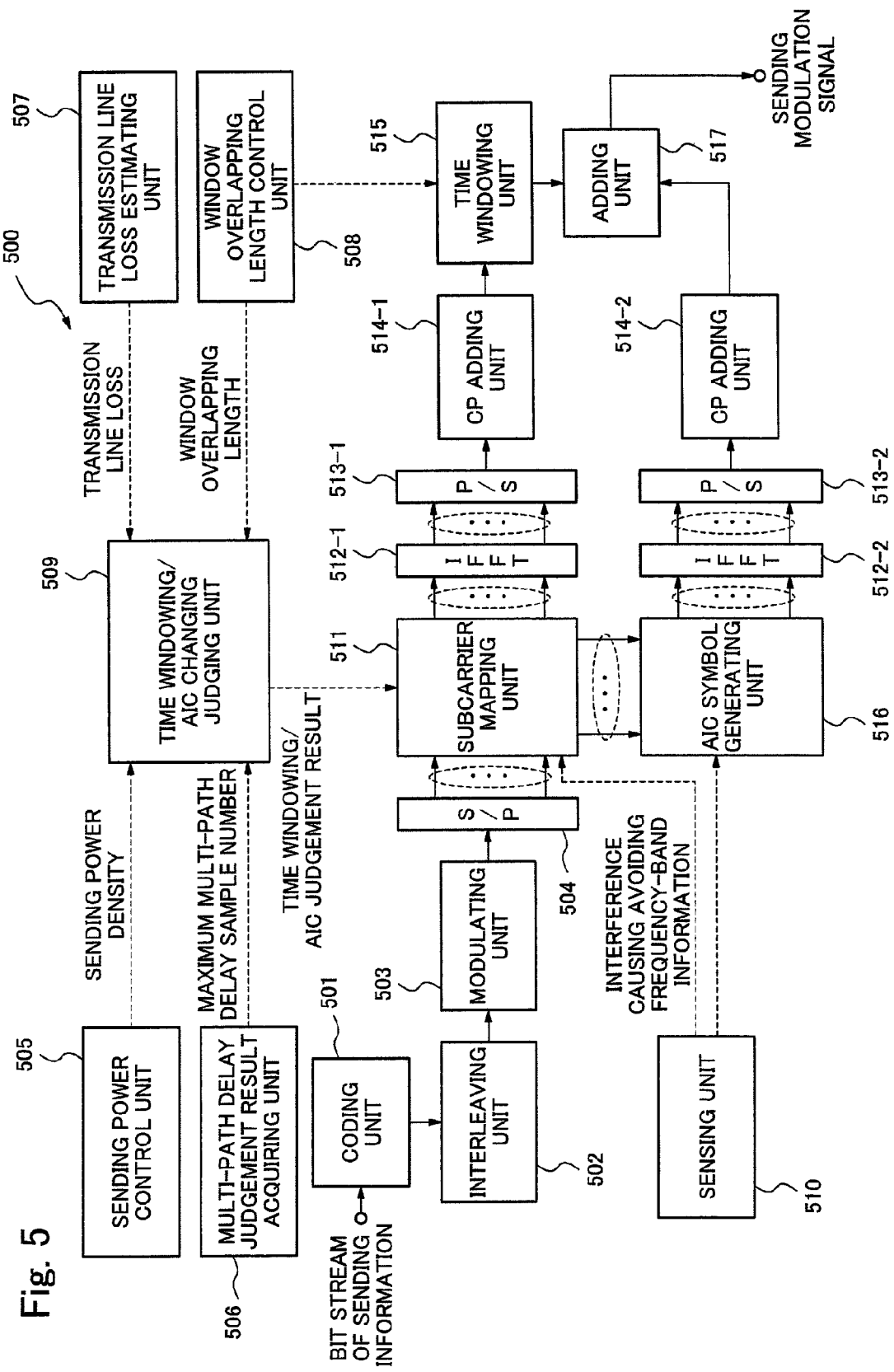
[FIG. 5] is a block diagram showing an exemplary configuration of a baseband unit, which is included in a wireless sending apparatus according to a second exemplary embodiment of the present invention and which is processed by the digital processing.

FIG. 5 is a block diagram showing an exemplary configuration of a baseband unit 500, which is included in a wireless sending apparatus according to a second exemplary embodiment of the present invention and which is processed by the digital processing. The baseband unit 500 includes an encoding unit 501, an interleaving unit 502, a modulating unit 503, a S/P (Serial/Parallel) conversion unit 504 (abbreviated as "S/P" in FIG. 5.), a sending power control unit 505, a multi-path delay measurement result acquiring unit 506, a transmission line loss estimating unit 507, a Window overlapping length control unit 508, a Time windowing/AIC changing judging unit 509 and a sensing unit 510. Furthermore, the baseband unit 500 includes a subcarrier mapping unit 511, IFFT units 512-1 and 512-2, P/S (Parallel/Serial) conversion units 513-1 and 513-2 (abbreviated as "P/S" in FIG. 5.), a CP adding unit 514-1, a GI (Guard Interval) adding unit 514-2, a Time windowing unit 515, an AIC symbol generating unit 516 and an adding unit 517.

The encoding unit 501, which inputs a bit stream of sending information, carries out an error correction coding process and outputs the coded bit stream to the interleaving unit 502. Here, for example, the convolutional code and the turbo code are used in the coding process.

The interleaving unit 502 inputs the encoded bit stream from the encoding unit 501, and carries out an interleaving process to change the order of the bit stream, and outputs the interleaved bit stream to the modulating unit 503.

The modulating unit 503 inputs the bit stream from the interleaving unit 502, and carries out a modulation process to map the bit stream into a symbol stream, and then outputs the modulated signal to the S/P conversion unit 504.

The S/P conversion unit 504 inputs the modulation signal from the modulating unit 503, and carries out the serial/parallel conversion to the inputted modulation signal, and outputs the modulated signal, which is converted into a parallel signal, to the subcarrier mapping unit 511.

The sending power control unit 505 determines sending power of a signal which the sending apparatus sends, and sends sending power density, which is calculated on the basis of the determined sending power, to the Time windowing/AIC changing judging unit 509.

The multi-path delay measurement result acquiring unit 506 acquires maximum multi-path delay sample number, which is measured by a sending destination apparatus, of a transmission line from the sending destination apparatus through a control channel, and outputs the acquired maximum multi-path delay sample number to the Time windowing/AIC changing judging unit 509. Here, the maximum multi-path delay sample number measured by the sending destination apparatus is obtained, for example, by carrying out a correlation process to a received pilot channel or CP.

The transmission line loss estimating unit 507 estimates transmission line loss between the sending apparatus and a first system receiving apparatus which should be protected, and outputs the estimated transmission line loss to the Time windowing/AIC changing judging unit 509. As a method for estimating the transmission line loss, a method to estimate the transmission line loss on the basis of a received pilot signal which is sent by the sending destination apparatus, and a method to estimate the transmission line loss on the basis of a distance between the sending apparatus and the first system receiving apparatus which should be protected are exemplified.

The Window overlapping length control unit 508 determines a Window overlapping length which is a parameter of the waveform shaping of the Time windowing method, and outputs the determined Window overlapping length to the Time windowing/AIC changing judging unit 509 and the Time windowing unit 515. Here, it is preferable that the Window overlapping length is coincident with a length of one side, to which the waveform shaping is carried out, of the OFDM symbol. Here, it may be preferable that the Window overlapping length has a fixed value which is set in advance.

Here, the sending power density, the maximum multi-path delay sample number, the transmission line loss between the sending apparatus and the first system receiving apparatus which should be protected, and the Window overlapping length are corresponding to the "change judging information" according to the first exemplary embodiment.

The Time windowing/AIC changing judging unit 509 inputs the "sending power density" which is provided by the sending power control unit 505, "the maximum multi-path delay sample number of the transmission line" which is provided by the multi-path delay measurement result acquiring unit 506, "the transmission line loss between the sending apparatus and the first system receiving apparatus which should be protected" (abbreviated as "transmission line loss" in FIG. 5) which is provided by the transmission line loss estimating unit 507, and the "Window overlapping length" which is provided by the Window overlapping length control unit 508. On the basis of these information, the Time windowing/AIC changing judging unit 509 judges per a predetermined frequency-domain group (for example, per an user) whether the Time windowing method which is processed in the time domain, or the AIC method which is processed in the frequency domain should be used as the interference causing avoiding means. The Time windowing/AIC changing judging unit 509 outputs the judgement result (judgement result, which is corresponding to the change judgement result according to the first exemplary embodiment, may be described hereinafter as "Time windowing/AIC judgement result" in some cases.) to the subcarrier mapping unit 511.

Here, the Time windowing/AIC changing judging unit 509 inputs one or plural information out of a plurality of the change judging information and carries out the judgement on the change with reference to the one or plural information.

The sensing unit 510 senses a situation of communication in the first system, and outputs information on a frequency band used by the first system, that is, information on a frequency band in which the interference should be avoided from being caused (hereinafter, the information may be described as interference causing avoiding frequency-band information) to the subcarrier mapping unit 511 and the AIC symbol generating unit 516.

The subcarrier mapping unit 511 inputs the modulation signal from the S/P conversion unit 504, and inputs the Time windowing/AIC judgement result from the Time windowing/AIC changing judging unit 509, and inputs the interference causing avoiding frequency-band information from the sensing unit 510. The subcarrier mapping unit 511, with reference to the Time windowing/AIC judgement result, separates the modulation signal in two directions, and afterward the modulation signal in one direction is processed per the user with the Time windowing method, and the modulation signal in the other direction is processed per the user with the AIC method. Furthermore, the subcarrier mapping unit 511 carries out a subcarrier mapping with reference to the interference causing avoiding frequency-band information so that the frequency band in which the interference is avoided from being caused may not include any subcarrier. The subcarrier mapping unit 511 outputs the user's modulation signal, to which the Time windowing process is carried out, to the IFFT unit 512-1, and outputs the user's modulation signal, to which the AIC process is carried out, to the AIC symbol generating unit 516.

The IFFT unit 512-1, which inputs the modulation signal from the subcarrier mapping unit 511, generates a subcarrier signal through carrying out an IFFT process to the inputted modulation signal, and outputs the generated subcarrier signal to the P/S conversion unit 513-1.

The P/S conversion unit 513-1 inputs the subcarrier signal from the IFFT unit 512-1, and carries out the parallel/serial conversion to the inputted subcarrier signal, and outputs the modulation signal, which is converted into a serial signal, to the CP adding unit 514-1.

The CP adding unit 514-1 inputs the modulation signal from the P/S conversion unit 513-1, and carries out a CP addition through copying a post-portion of the OFDM symbol and pasting the copied post-portion in front of the OFDM symbol, and outputs the signal, to which the CP addition is carried out, to the Time windowing unit 515.

The Time windowing unit 515 inputs the signal, to which the CP addition is carried out, from the CP adding unit 514-1, and inputs the Window overlapping length from the Window overlapping length control unit 508. The Time windowing unit 515 copies a pre-portion of the OFDM symbol to which the CP addition has not been carried out yet, and pastes the copied pre-portion at the back of the OFDM symbol as a Tail addition. Next, the waveform of the OFDM symbol, which extends in the time domain, is shaped, and then the OFDM symbol overlaps partially with a following OFDM symbol and a preceding OFDM symbol whose waveforms are shaped. For example, a raised cosine roll-off waveform is applicable to shaping the OFDM symbol. The waveform shaping is carried out on the basis of the Window overlapping length. The Time windowing unit 515 outputs the modulation signal, to which the Time windowing process is carried out, to the adding unit 517.

Meanwhile, the AIC symbol generating unit 516 inputs the interference causing avoiding frequency-band information from the sensing unit 510, and furthermore input the user's modulation signal, to which the AIC process is carried out, from the subcarrier mapping unit 511. The AIC symbol generating unit 516 calculates a symbol for canceling a leak component of the interference which is caused in the interference causing avoiding frequency band, and inserts the calculated symbol into the modulation signal, and then outputs the modulation signal, into which the AIC symbol is inserted, to the IFFT unit 512-2.

The IFFT unit 512-2 inputs the modulation signal, into which the AIC symbol for canceling the leak component of the interference is inserted, from the AIC symbol generating unit 516, and generates a subcarrier signal through carrying out the IFFT process. The IFFT unit 512-2 outputs the modulation signal, to which the IFFT process is carried out, to the P/S conversion unit 513-2.

The P/S conversion unit 513-2 inputs the modulation signal from the IFFT unit 512-2, and carries out the parallel/serial conversion, and outputs the modulation signal, which is converted into a serial signal, to the GI adding unit 514-2.

The GI adding unit 514-2 inputs the modulation signal from the P/S conversion unit 513-2, and adds GI, which is padded with, for example, 0 (zero), in front of the OFDM symbol, and outputs the modulation signal, to which GI is added, to the adding unit 517.

The adding unit 517 inputs the modulation signal which is provided by the Time windowing unit 515, and the modulation signal which is provided by the GI adding unit 514-2, and adds two modulation signals, and afterward outputs a signal, which is generated by the addition, as a sending modulation signal.

Figure 6:
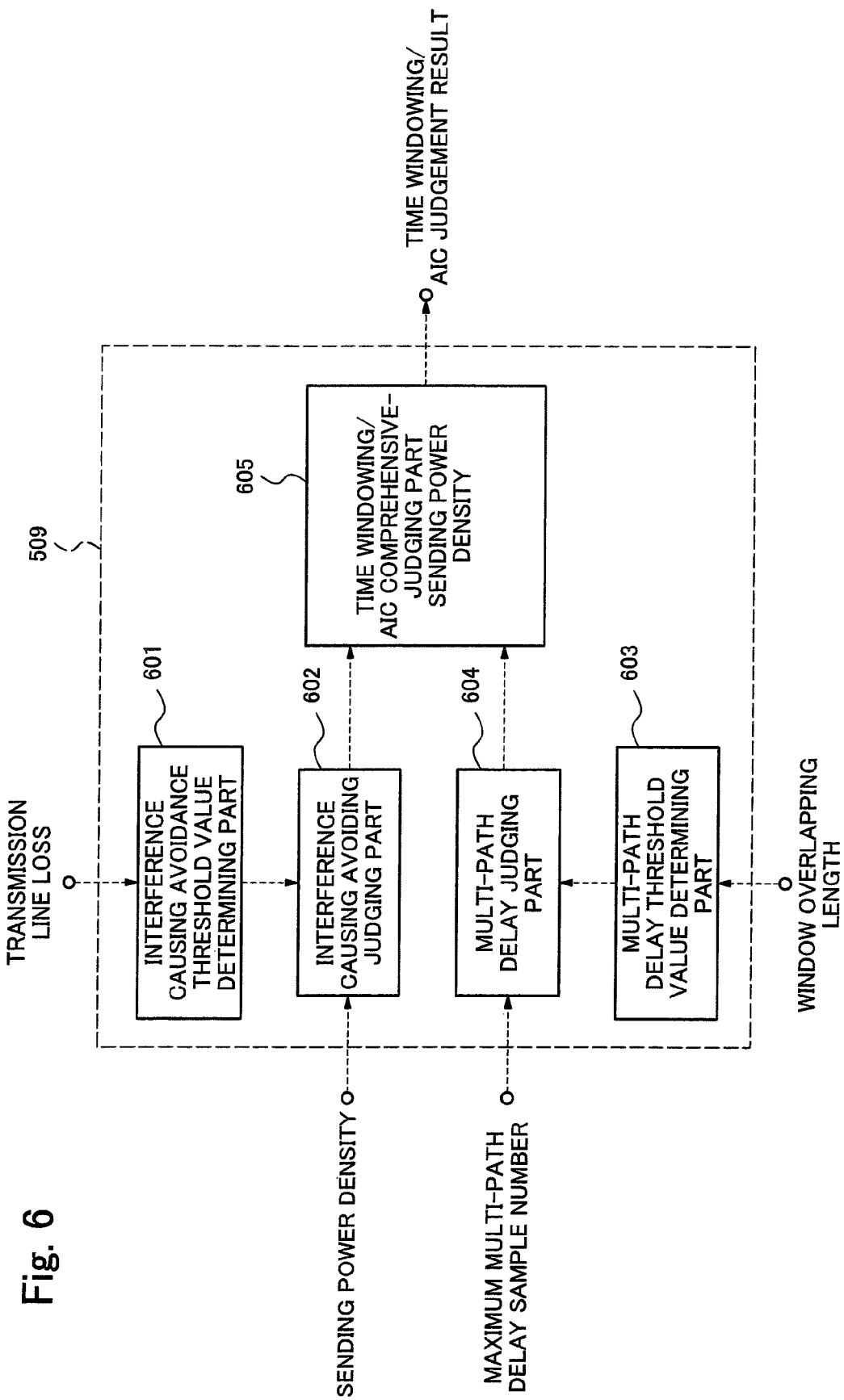
[FIG. 6] is a block diagram showing an exemplary configuration of a Time windowing/AIC changing judging unit shown in FIG. 5.

FIG. 6 is a block diagram showing an exemplary configuration of the Time windowing/AIC changing judging unit 509 shown in FIG. 5. The Time windowing/AIC changing judging unit 509 includes an interference causing avoidance threshold value determining part 601, an interference causing avoiding judging part 602, a multi-path delay threshold value determining part 603, a multi-path delay judging unit 604 and a Time windowing/AIC comprehensive-judging part 605.

The interference causing avoidance threshold value determining part 601 inputs the transmission line loss (abbreviated as "transmission line loss" in FIG. 6) between the sending apparatus and the first system receiving apparatus, which should be protected, from the transmission line loss estimating unit 507. The interference causing avoidance threshold value determining part 601 determines an interference causing avoidance threshold value on the basis of the transmission line loss, and, for example, permissible interference power density of the first system receiving apparatus which is predetermined in advance and a leak coefficient of a leak component which leaks outside the sending frequency band when applying the Time windowing method. The interference causing avoidance threshold value θ [dBm/Hz] is expressed in a formula (1).

$$\theta \propto R + L - I \tag{1}$$

In the formula (1), R indicates permissible interference power density [dBm/Hz] of the first system receiving apparatus, and L indicates the transmission line loss [dB] between the sending apparatus and the first system receiving apparatus which should be protected, and I indicates the leak coefficient [dB] of the leak component which leaks outside the sending frequency band when applying the Time windowing method.

The interference causing avoidance threshold level determining part 601 outputs the determined interference causing avoidance threshold value ▫ to the interference causing avoiding judging part 602.

The interference causing avoiding judging part 602 inputs the sending power density of the sending signal which is provided by the sending power control unit 505 (refer to FIG. 5), and the interference causing avoidance threshold value ▫ which is provided by the interference causing avoidance threshold level determining part 601. The interference causing avoiding judging part 602 judges, for example, whether the sending power density is smaller than the interference causing avoidance threshold value ▫. In the case that the sending power density is smaller than the interference causing avoidance threshold value, the interference causing avoiding judging part 602 judges that a condition required for the judgement is satisfied. The interference causing avoiding judging part 602 outputs the judgement result (interference causing avoiding judgement result) to the Time windowing/AIC comprehensive-judging part 605.

The multi-path delay threshold value determining part 603 inputs the Window overlapping length, which is a parameter of the waveform shaping when applying the Time windowing method, from the Window overlapping length control unit 508 (refer to FIG. 5). On the basis of the Window overlapping length, the multi-path delay threshold value determining part 603 calculates an effective CP length in the case of applying the Time windowing method, and uses the calculated effective CP length as the multi-path delay threshold value. The multi-path delay threshold value ▫ [sample] is expressed, for example, in a formula (2).

$$\xi = L_{CP} - L_{OV} \quad (2)$$

In the formula (2), $L_{cp}$ indicates the CP length [sample], and $L_{ov}$ indicates the Window overlapping length [sample] in the case of applying the Time windowing method.

The multi-path delay threshold value determining part 603 outputs the determined multi-path delay threshold value ▫ to the multi-path delay determining part 604.

The multi-path delay judging part 604 inputs the maximum multi-path delay sample number which is provided by the multi-path delay measurement result acquiring unit 506 (refer to FIG. 5), and the multi-path delay threshold value ▫ which is provided by the multi-path delay threshold value determining part 603. The multi-path delay judging part 604 judges, for example, whether the maximum multi-path delay sample number is smaller than the multi-path delay threshold value ▫. In the case that the maximum multi-path delay sample number is smaller than the multi-path delay threshold value, the multi-path delay judging part 604 judges that a condition required for the judgement is satisfied. The multi-path delay judging part 604 outputs the judgement result (multi-path delay judgement result) to the Time windowing comprehensive-judging part 605.

The Time windowing/AIC comprehensive-judging part 605 inputs the interference causing avoiding judgement result which is provided by the interference causing avoiding judging part 602, and the multi-path delay judgement result which is provided by the multi-path delay judging part 604. The Time windowing/AIC comprehensive-judging part 605 carries out a comprehensive judgement on changing the Time window method and the AIC method with reference to any one or both of the interference causing avoiding judgement result and the multi-path delay judgement result. The Time windowing/AIC comprehensive-judging part 605 outputs the judgement result (Time windowing/AIC judgement result) to the subcarrier mapping unit 511 (refer to FIG. 5).

Figure 7:
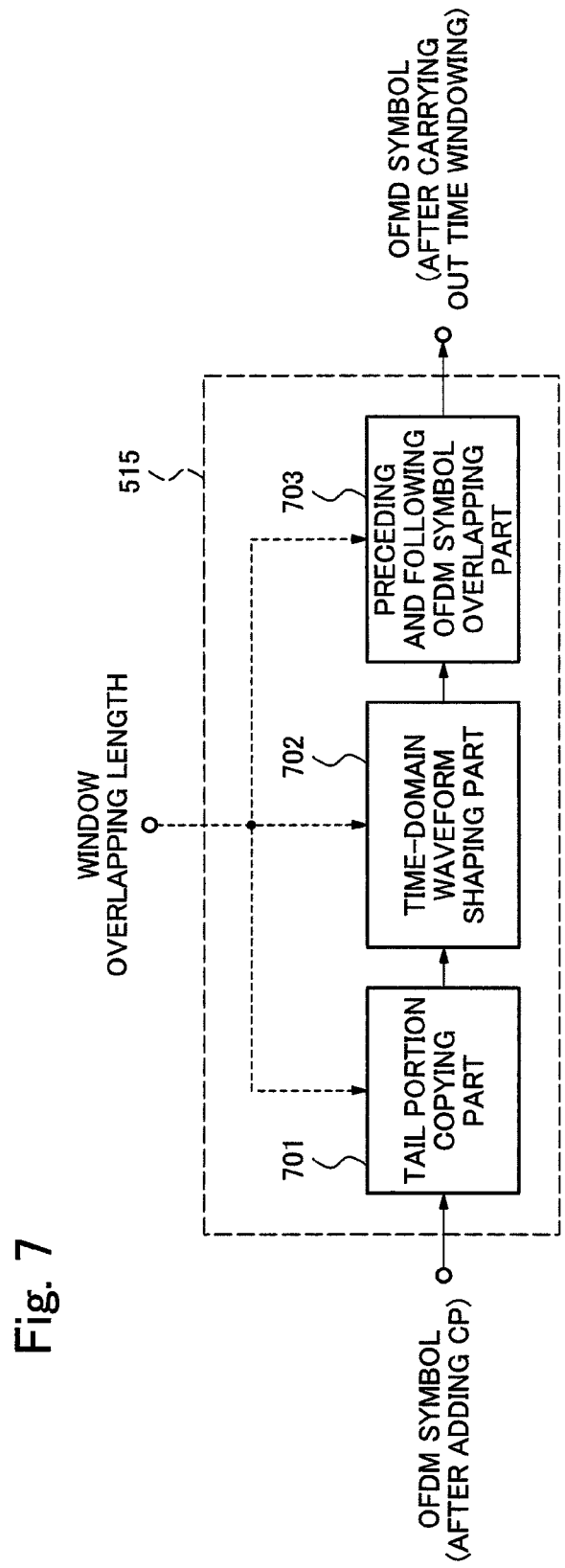
[FIG. 7] is a block diagram showing an exemplary configuration of a Time windowing unit shown in FIG. 5.

FIG. 7 is a block diagram showing an exemplary configuration of the Time windowing unit 515 shown in FIG. 5. The Time windowing unit 515 includes a Tail portion copying part 701, a time-domain waveform shaping part 702 and a preceding and following OFDM symbol overlapping part 703.

The Tail portion copying part 701 inputs the OFDM symbol, to which CP has been added, from the CP adding unit 514-1 (refer to FIG. 5) and inputs the Window overlapping length from the Window overlapping length control unit 508 (refer to FIG. 5). The Tail portion copying part 701 copies a pre-portion of the OFDM symbol, to which CP has not been added yet, on the basis of the Window overlapping length, and adds the pre-portion at the back of the OFDM symbol as a Tail. The Tail portion copying part 701 outputs the OFDM symbol, to which the Tail has been added, to the time-domain waveform shaping part 702.

The time-domain waveform shaping part 702 inputs the OFDM symbol, to which CP and Tail are added, from the Tail portion copying unit and inputs the Window overlapping length from the Window overlapping length control unit 508. The time-domain waveform shaping part 702 carries out the time-domain waveform shaping in a CP section and a Tail section on the basis of the Window overlapping length. As an example of the waveform shaping, the raised cosine roll-off type waveform shaping is exemplified. Here, a waveform shaping characteristic g (t) at sample t is expressed in a formula (3).

$$g(t) = \begin{cases} \frac{1}{2} + \frac{1}{2}\cos\left(\pi + \frac{\pi t}{L_{OV}}\right), & 0 \le t < L_{OV} \\ 1, & L_{OV} \le t < L_{CP} + N_{FFT} \\ \frac{1}{2} + \frac{1}{2}\cos\left(\frac{\pi(t-(L_{CP}+N_{FFT}))}{L_{OV}}\right), & L_{CP} + N_{FFT} \le t < L_{CP} + N_{FFT} + L_{OV} \end{cases} \quad (3)$$

In the formula (3), NFFT indicates FFT size.

The time-domain waveform shaping part 702 outputs the signal, to which the waveform shaping is carried out, to the preceding and following OFDM symbol overlapping part 703.

The preceding and following OFDM symbol overlapping part 703 inputs the signal, to which the waveform shaping is carried out, from the time-domain waveform shaping part 702 and inputs the Window overlapping length from the Window overlapping length control unit 508 (refer to FIG. 5). On the basis of the Window overlapping length, the preceding and following OFDM symbol overlapping part 703 carries out an overlapping by adding the CP section (Head window) of the own symbol to which the waveform shaping is carried out, and the Tail section of the preceding symbol (Tail window) to which the waveform shaping is carried out. Similarly, the preceding and following OFDM symbol overlapping part 703 overlaps a part of the Tail section of the own symbol to which the waveform shaping is carried out, and a part of the CP section of the following symbol to which the waveform shaping is carried out.

Figure 8:
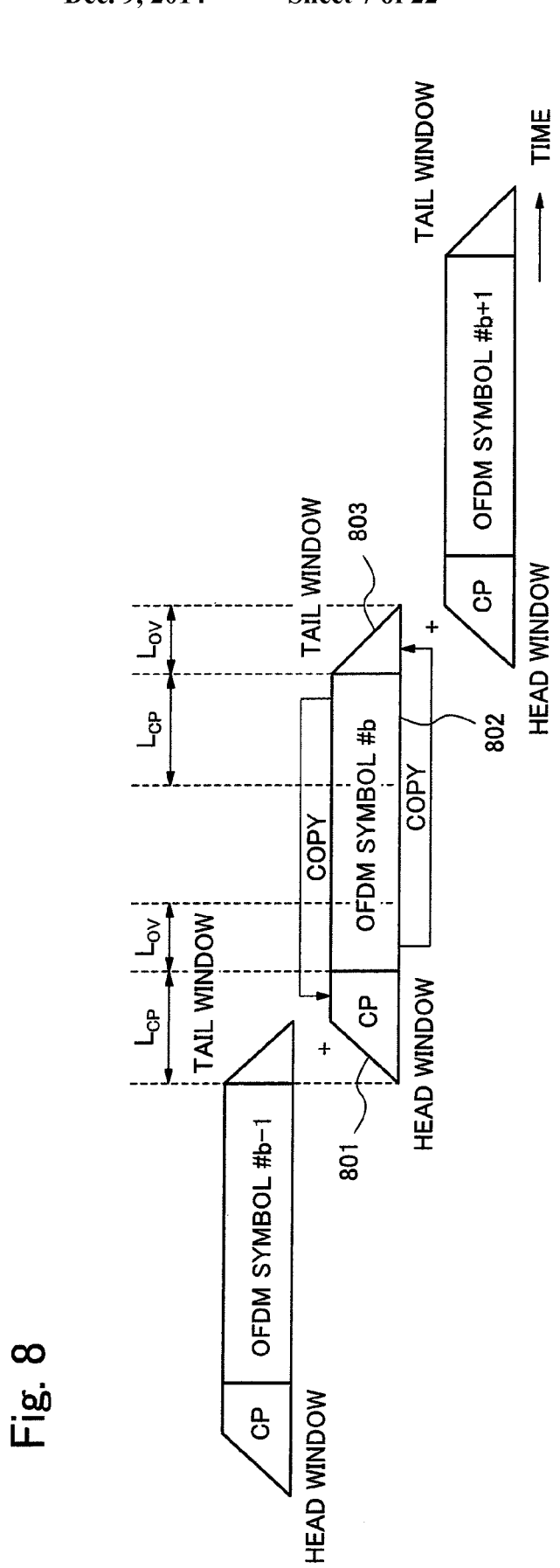
[FIG. 8] is a principle diagram showing a process of the Time windowing method.

FIG. 8 is a principle diagram showing the Time windowing process. In FIG. 8, the sample number of CP 801 and Tail 803 are corresponding to $L_{cp}$ and $L_{ov}$ respectively, and then the effective CP length is expressed by $L_{cp} - L_{ov}$. Accordingly, immunity against the multi-path is lost by $L_{ov}$. The Time windowing unit 515 (preceding and following OFDM symbol overlapping part 703) outputs the signal, to which the waveform shaping is carried out and to which the preceding and the following OFDM symbols are added, to the adding unit 517.

Figure 9:
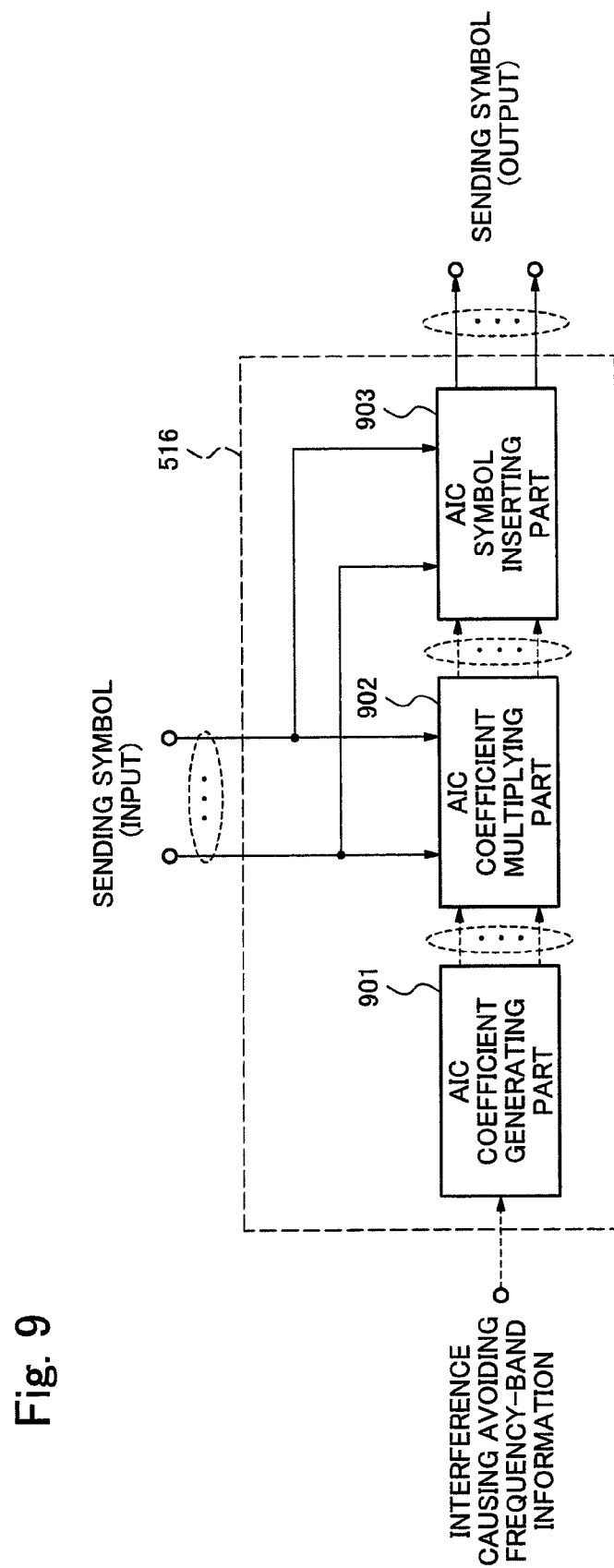
[FIG. 9] is a block diagram showing an exemplary configuration of an AIC symbol generating unit shown in FIG. 5.

FIG. 9 is a block diagram showing an exemplary configuration of the AIC symbol generating unit 516 shown in FIG. 5. The AIC symbol generating unit 516 includes an AIC coefficient generating part 901, an AIC coefficient multiplying part 902 and an AIC symbol inserting part 903.

The AIC coefficient generating part 901 inputs the interference causing avoiding frequency-band information from the sensing unit 510 (refer to FIG. 5), and calculates an AIC coefficient, and outputs the calculated AIC coefficient to the AIC coefficient multiplying part 902. Here, the AIC coefficient is corresponding to, for example, a matrix W in a formula (10) which will be described later. The AIC coefficient multiplying part 902 inputs the AIC coefficient from the AIC coefficient generating part 901 and inputs the sending symbol, which is the modulation signal, from the subcarrier mapping unit 511 (refer to FIG. 5). The AIC coefficient multiplying part 902 generates an AIC symbol through multiplying the sending signal with the AIC coefficient, and outputs the generated AIC symbol to the AIC symbol inserting part 903. Here, the AIC symbol can be calculated, for example, by the formula (10) which will be described later.

The AIC symbol inserting part 903 inputs the sending symbol (described as "sending symbol (input)" in FIG. 9), to which the subcarrier mapping has been carried out, from the subcarrier mapping unit 511 (refer to FIG. 5), and inputs the AIC symbol from the AIC coefficient multiplying part 902. The AIC symbol inserting part 903 inserts the AIC symbol into the sending symbol to which the subcarrier mapping has been carried out. The AIC symbol inserting part 903 outputs the sending symbol (described as "sending symbol (output)" in FIG. 9), into which the AIC symbol is inserted, to the IFFT unit 512-2.

Figure 10:
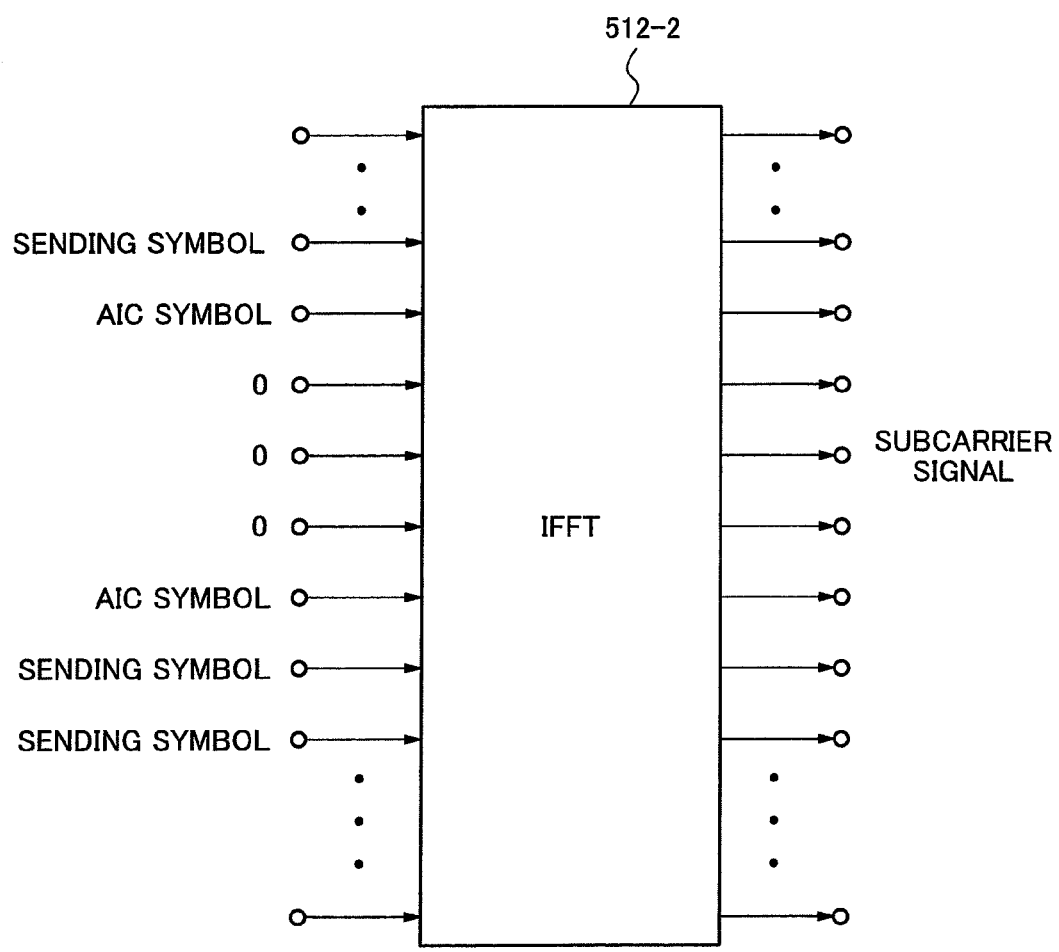
[FIG. 10] is an input signal pattern diagram showing an example of an input signal of an IFFT unit(IFFT unit which is connected with the AIC symbol generating unit) shown in FIG. 5.

FIG. 10 is an input signal pattern diagram showing an example of an input signal of the IFFT unit 512-2 shown in FIG. 5 (that is, output signal of the AIC symbol inserting part 903 shown in FIG. 9). FIG. 10 shows an example that, in addition to the sending symbol, zero is inserted as a symbol which is corresponding to the interference causing avoiding frequency band, and the AIC symbol is inserted outside the symbol which is corresponding to the interference causing avoiding frequency band.

Henceforth, an exemplary formula, by which the AIC symbol generating unit 516 generates the AIC symbol, will be expressed in a formula (4) to a formula (10).

An OFDM signal x(n) at a sample n (n=0, 1, . . . , N−1) in the time domain, which is the output of the IFFT unit 512-1, is expressed in a formula (4).

$$x(n) = \sum_{k=0}^{N-1} X(k)\exp\left(j2\pi\frac{nk}{N}\right) \quad (4)$$

In the formula (4), X(k) indicates the sending symbol, where k=0, 1, . . . , N−1.

In the case that M times up-sampling (M is not smaller than 1) is carried out, a spectrum Y(l) of the OFDM signal at a position l in the frequency domain is expressed in a formula (5), where l=0, 1, . . . , NM−1.

$$Y(l) = \frac{1}{N}\sum_{n=0}^{N-1} x(n)\exp\left(-j2\pi\frac{n}{N}\frac{l}{M}\right) \quad (5)$$

The spectrum Y(l) of the OFDM signal is expressed in a formula (6) on the basis of the formula (4) and the formula (5).

$$Y(l) = \frac{1}{N}\sum_{n=0}^{N-1}\sum_{k=0}^{N-1} X(k)\exp\left(j2\pi\frac{n}{N}\left(k-\frac{l}{M}\right)\right) = \frac{1}{N}\sum_{k=0}^{N-1} X(k)P(l,k) \quad (6)$$

In the formula (6), P(l,k) indicates the conversion kernel.

Next, when number of the subcarriers in the interference causing avoiding frequency band before the up-sampling is denoted as $N_i$, a column vector $d_1$ of side lobe component $M(N_i-1)+1$ rows in the interference causing avoiding frequency band after the up-sampling is expressed in a formula (7).

$$d_1 = P_s g \quad (7)$$

In the formula (7), $P_s$ indicates a partial matrix $(M(N_i-1)+1)\times N$ which extracts rows corresponding to the side lobe component, which is in the interference causing avoiding frequency band and to which the up-sampling has been carried out, out of a matrix P whose component is expressed as P(l,k). Moreover, g in the formula (7) indicates a column vector of N rows which is composed of the sending symbol whose components corresponding to the interference causing avoiding frequency band and the AIC tone are set zero.

A signal to cancel the side lobe component in the interference causing avoiding frequency band is expressed in a formula (8).

$$P_1 h = -d_1 \quad (8)$$

Here, in the case that number of AIC tones is assumed to be 2, $P_1$ indicates a partial matrix of $(M(N_i-1)+1)\times(N_i+2)$ out of the matrix $P_s$ which takes only the interference causing avoiding frequency band and the AIC tone into consideration, and h indicates a column vector of $(N_i+2)$ rows of the AIC symbol which cancels the interference component.

Since the matrix $P_1$ is not the square matrix, the column vector h is calculated with the minimum square error method. A square error $e^2$ is expressed in a formula (9) on the basis of the formula (8).

$$e^2 = \|P_1 h + d_1\|^2 \quad (9)$$

The column vector h, which cancels the interference component, is expressed in a formula (10) on the basis of the formula (9).

$$h = -(P_1^T P_1)^{-1} P_1^T d_1 = -(P_1^T P_1)^{-1} P_1^T P_s g = -Wg \quad (10)$$

Here, W is a matrix of $(N_i+2)\times N$ and is corresponding to the output signal of the AIC coefficient generating part 901. The column vector h of the AIC symbol, which cancels the interference component, can be calculated on the basis of the matrix W and the column vector g of the sending symbol, and the column vector h of the AIC symbol is corresponding to the output of the AIC coefficient multiplying part 902. It is necessary to carry out the matrix multiplication including calculation of the inverse matrix in order to calculate the matrix W. As a result, number of the calculations is large. Especially, under a condition that the interference causing avoiding frequency band is changed dynamically, it is necessary to update the matrix W every time when a position of the interference causing avoiding frequency band or the interference causing avoiding frequency bandwidth changes. For this reason, it is difficult to calculate and hold the matrix W in advance, and consequently the problem that large number of calculations are required becomes serious.

Figure 11:
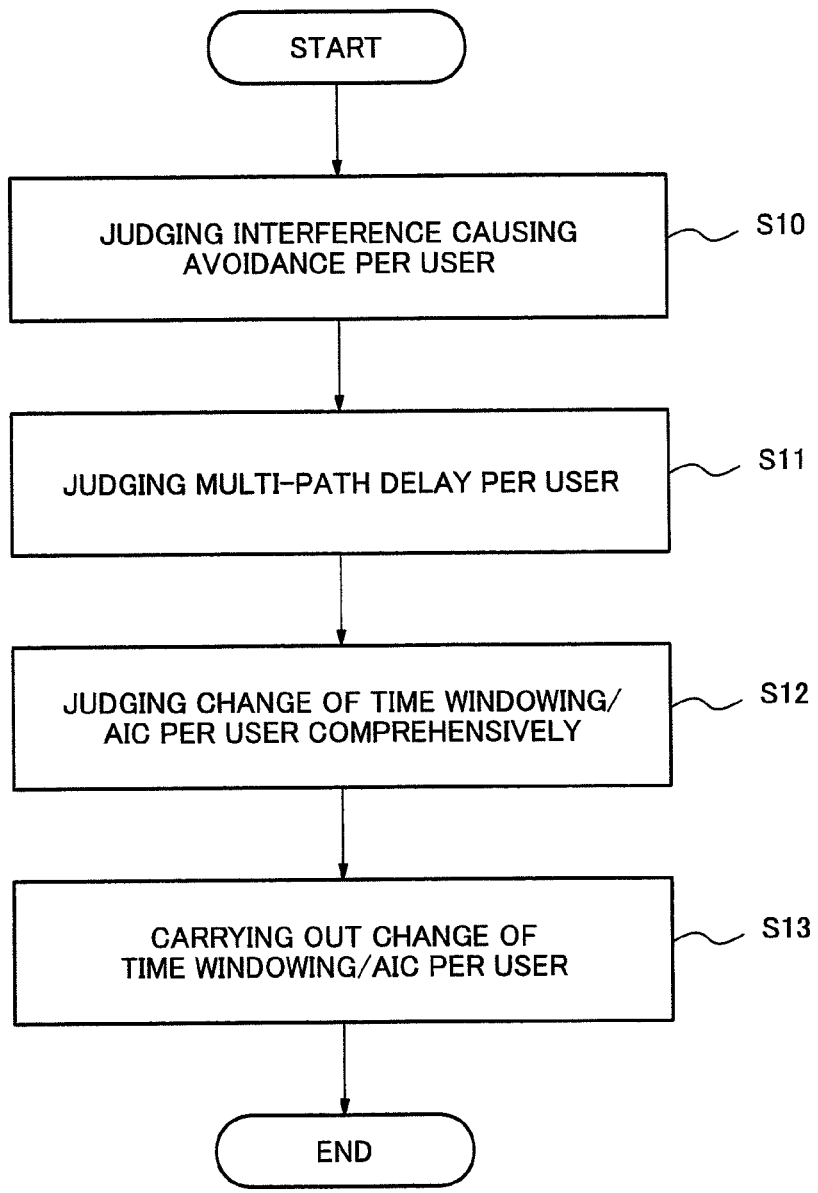
[FIG. 11] is a flowchart describing an example of the operation of the baseband unit (baseband unit which is included in the wireless sending apparatus according to the second exemplary embodiment of the present invention) shown in FIG. 5.

FIG. 11 is a flowchart describing an example of an operation of the baseband unit 500 shown in FIG. 5. Operations of the Time windowing/AIC changing judging unit 509 and the subcarrier mapping unit 511 will be described mainly in the following description. Moreover, FIG. 5 and FIG. 6 are referred to if necessary. As an outline of the operation, the Time windowing method and the AIC method are changed each other adaptively on the basis of the sending power density and the maximum multi-path delay sample number.

The interference causing avoiding judging part 602 (refer to FIG. 6) of the Time windowing/AIC changing judging unit 509 carries out the interference causing avoiding judgement per the user (Step S10). Specifically, the interference causing avoiding judging part 602 judges per the user with reference to the sending power density and the interference causing avoidance threshold value whether an interference causing avoiding criteria, which is required when applying the Time windowing method, is satisfied. For example, in the case that the sending power density is smaller than the interference causing avoidance threshold value, the interference causing avoiding judging part 602 judges that the condition for the judgement is satisfied.

The multi-path delay judging part 604 (refer to FIG. 6) of the Time windowing/AIC changing judging unit 509 carries out the multi-path delay judgement per the user (Step S11). Specifically, the multi-path delay judging part 604 judges per the user with reference to the maximum multi-path delay sample number and the multi-path delay threshold value whether the effective CP length, which is required when applying the Time widowing method, is satisfied. For example, in the case that the maximum multi-path delay sample number is smaller than the multi-path delay threshold value, the multi-path delay judging part 604 judges that the condition for the judgement is satisfied.

The Time windowing/AIC comprehensive-judging part 605 (refer to FIG. 6) of the Time windowing/AIC changing judging unit 509 carries out the comprehensive judgement on the change between the Time windowing method and the AIC method with reference to any one or both of the interference causing avoiding judgement result and the multi-path delay judgement result (Step S12). The Time windowing/AIC comprehensive-judging part 605 outputs the judgement result as the "Time windowing/AIC judgement result".

The subcarrier mapping unit 511 (refer to FIG. 5) changes the interference causing avoiding transmission method through separating the modulation signal, which is provided by the S/P conversion unit 504, in two directions per the user, that is, through processing the modulation signal, which is in one direction, per the user with the Time windowing method, and through processing the modulation signal, which is in the other direction, per the user with the AIC method (Step S13).

Next, details of the interference causing avoiding judging process (process shown in Step S10) in FIG. 11 will be described.

Figure 12:
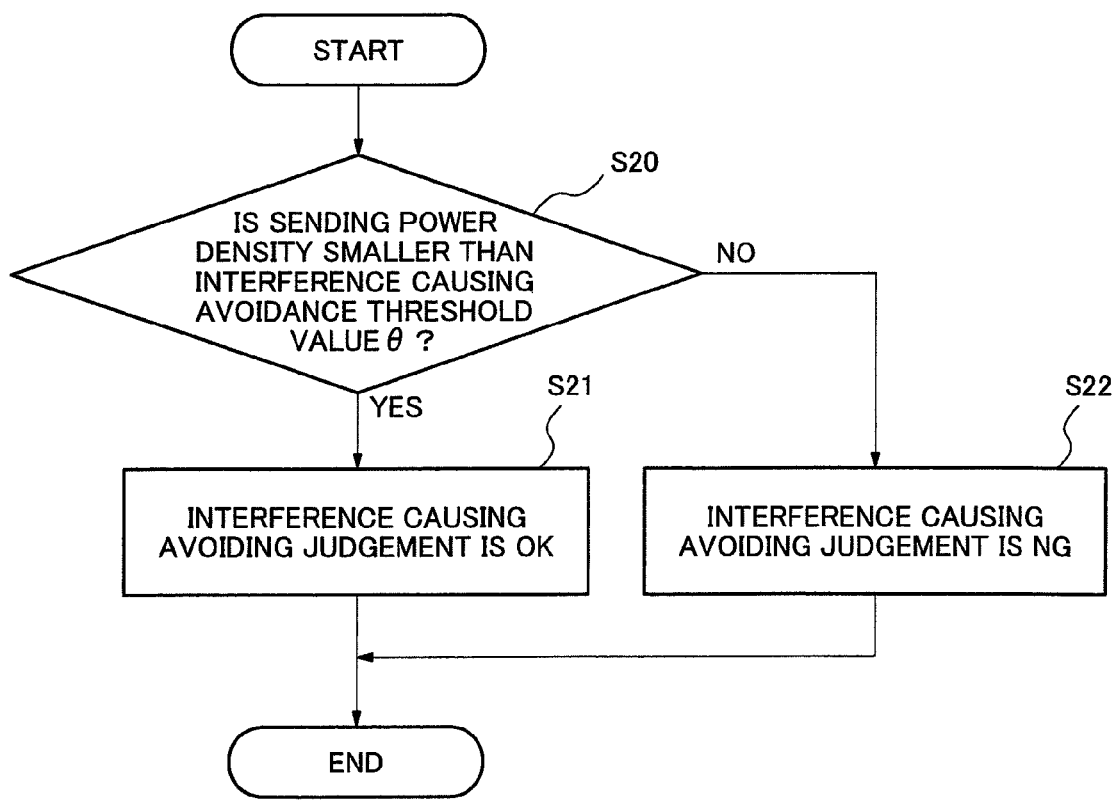
[FIG. 12] is a flowchart describing a detailed exemplary operation of an interference causing avoiding judging process shown in FIG. 11.

FIG. 12 is a flowchart describing a detailed exemplary operation of the interference causing avoiding judging process shown in FIG. 11 (specifically, process shown in Step S10). The interference causing avoiding judging part 602 (refer to FIG. 6) compares the sending power density with the interference causing avoidance threshold value ◘ (for example, ◘ is calculated by the formula (1)) (Step S20). In the case that the sending power density is smaller than the interference causing avoidance threshold value ◘ (Yes in Step S20), the interference causing avoiding judging part 602 judges that the interference causing avoiding judgement result is OK (Step S21). On the other hand, in the case that the sending power density is not smaller than the interference causing avoidance threshold value ◘ (No in Step S20), the interference causing avoiding judging part 602 judges that the interference causing avoiding judgement result is NG (Step S22).

Figure 13:
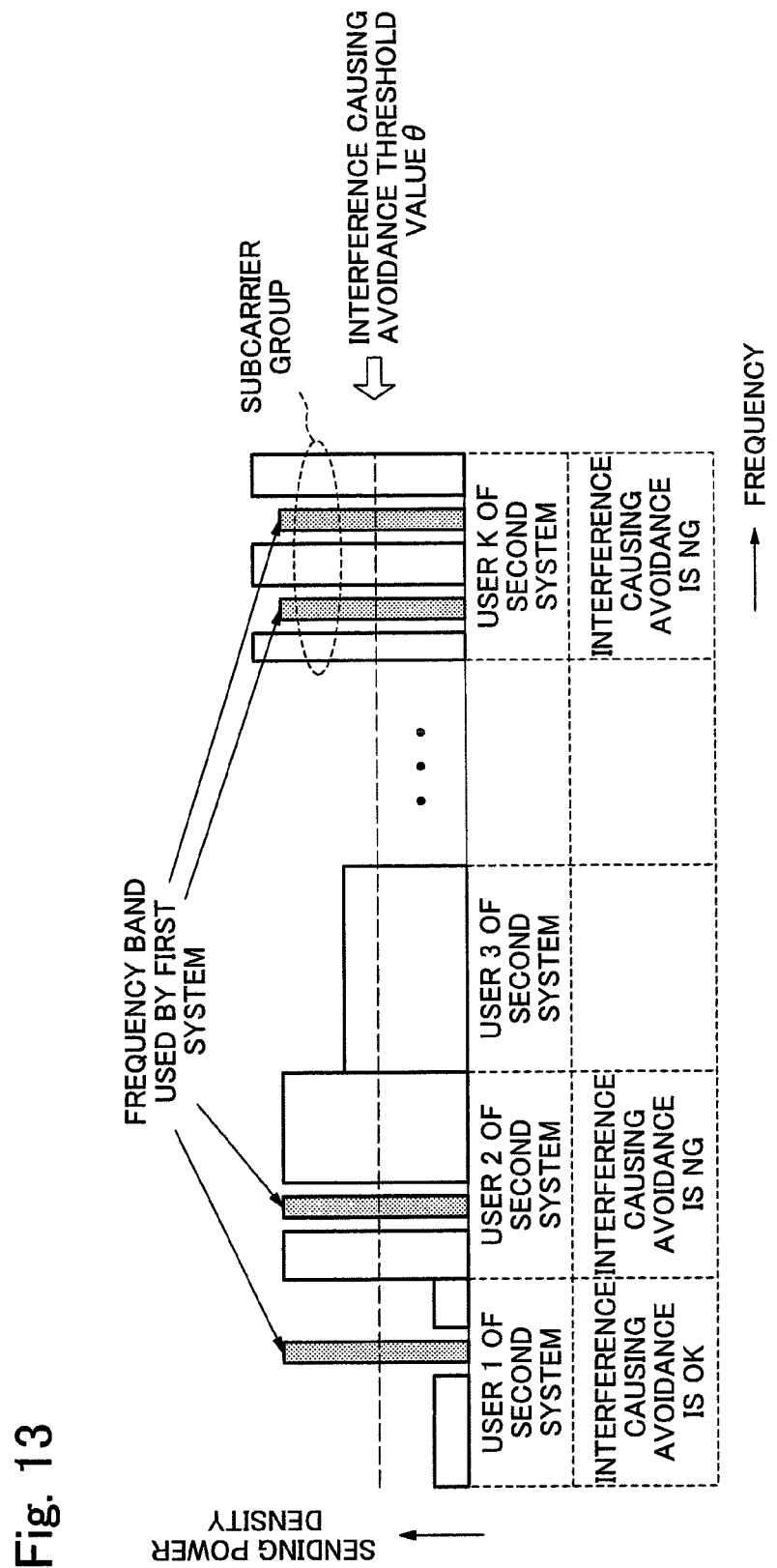
[FIG. 13] is a schematic diagram (graph) showing an image of an interference causing avoiding judgement on the basis of sending power density of a sending signal.

Moreover, FIG. 13 is a schematic diagram (graph) showing an image of the interference causing avoiding judgement on the basis of the sending power density of the sending signal. FIG. 13, whose horizontal axis indicates the frequency and the vertical axis indicates the sending power density, shows a state that a plurality of signals, which a plurality of users of the second system input, are multiplexed on the frequency axis. Moreover, as understood by FIG. 13, the notch is formed in the frequency band of the second system so that the frequency band of the second system may not overlap with one of the first system. Generally, as the sending power density of the second system becomes large, the power which leaks outside the frequency band also becomes large. As a result, the interference causing power becomes large. Contrarily, in the case that the sending power density is small, the power which leaks outside the frequency band also becomes small. As a result, the interference causing power becomes small. FIG. 13 shows a case that, in the case that the sending power density of the second system is smaller than the interference causing avoidance threshold value ◘, it is judged that the interference causing avoiding judging condition is satisfied (that is, OK), and in the case that the sending power density of the second system is not smaller than the interference causing avoidance threshold value ◘, it is judged that the interference causing avoiding judging condition is not satisfied (that is, NG).

Moreover, in the case that the distance between the sending apparatus of the second system and the receiving apparatus of the first system is known, it is possible to estimate the transmission line loss. In this case, it may be preferable to set the interference causing avoidance threshold value in consideration of the permissible interference power density, and the sending and receiving antenna gain. In this case, the interference causing avoidance threshold value ◘$_k$ [dBm/Hz], for example, for an user k (k=1, 2, . . . , K) is expressed in a formula (11).

$$\theta_k = R + L_k - I - G_{STX} - G_{PRX} \qquad (11)$$

In the formula (11), R indicates the permissible interference power density [dBm/Hz] of the first system receiving apparatus, and $L_k$ indicates the transmission line loss [dB] which is corresponding to a distance between a sending apparatus of the user k and the first system receiving apparatus which should be protected. Moreover, in the formula (11), I indicates the leak coefficient [dB] of the power which leaks outside the frequency band when applying the Time windowing method, and $G_{stx}$ indicates the sending and receiving antenna gain [dB] of the sending apparatus, and $G_{prx}$ indicates the antenna gain [dB] of the first system receiving apparatus which should be protected.

It may be preferable that the interference causing avoiding judgement is carried out on the basis of information on, for example, an amount of the interference caused to the first system receiving apparatus which should be protected, database on the first system, CPC (Cognitive Pilot Channel), the sensing result, a frequency band with no sending signal, a distance in the frequency domain from the interference causing avoiding frequency band, directivity of a sending beam or the like in addition to the sending power density of the second system sending apparatus. In this case, a threshold value corresponding to each change judging information is set as the interference causing avoidance threshold value.

Next, details of the multi-path delay judging process shown in FIG. 11 (specifically, process shown in Step S11) will be described. A case that the multi-path delay is judged according to the multi-path delay of the transmission line of the second system is exemplified as an example of the multi-path delay judging process.

Figure 14:
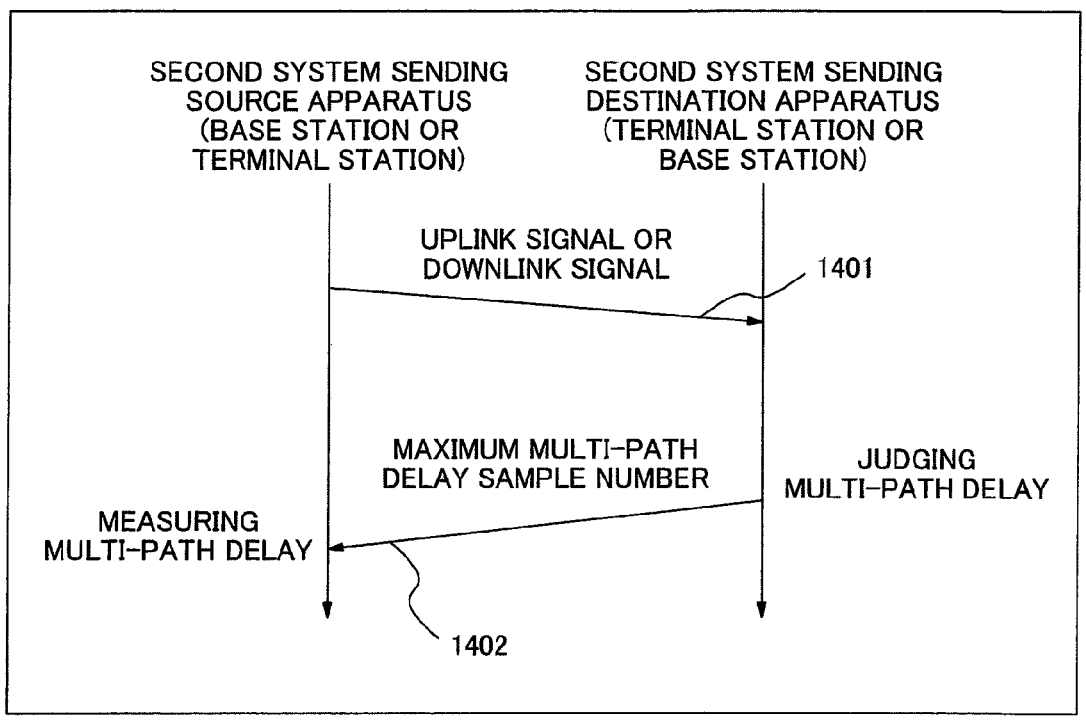
[FIG. 14] describes a procedure of measuring multi-path delay of a second system, and in particular.

FIG. 14 describes a procedure of measuring the multi-path delay of the second system, and in particular, FIG. 14 is a sequence chart describing a procedure in which the sending destination apparatus of the second system measures the multi-path delay of the second system.

The sending destination apparatus (for example, terminal station or base station) of the second system measures the multi-path delay of a transmission line on which a downlink or uplink signal 1401 flows, and reports the measured multi-path delay to a sending source apparatus of the second system (for example, base station or terminal station) via a link 1402 whose signal direction is reverse to one of the interference causing avoiding control link. It is suitable to use the maximum multi-path delay sample number as the multi-path delay which should be reported. Moreover, it may be preferable to use a delay spread as substitutable information.

Figure 15:
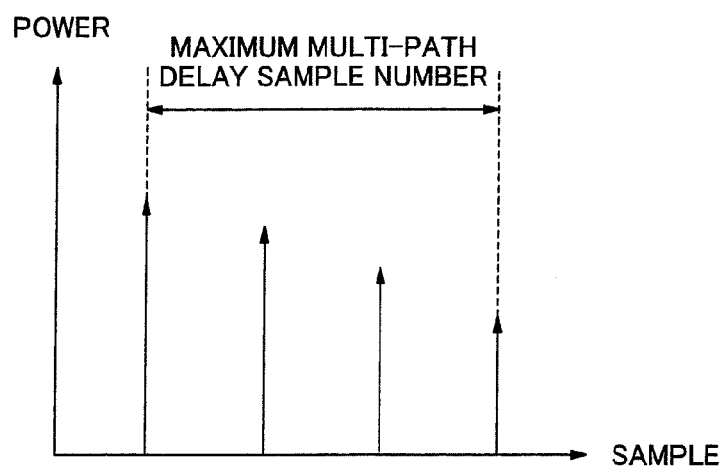
[FIG. 15] is a schematic diagram describing an image of an impulse response of a transmission line in order to describe maximum multi-path delay sample number.

FIG. 15 is a schematic diagram showing an image of an impulse response of the transmission line in order to describe the maximum multi-path delay sample number. The maximum multi-path delay sample number indicates, for example, number of samples between the earliest time when the sending signal arrives through one effective path out of the multi-path, and the latest time when the sending signal arrives through another effective path. The sending source apparatus of the second system compares the maximum multi-path delay sample number, which is reported, with the effective CP length which is used when applying the Time windowing method. Then, the sending source apparatus judges that the user, whose maximum multi-path delay sample number is smaller than number corresponding to the effective CP length, satisfies a multi-path delay judging condition, and the user, whose maximum multi-path delay sample number is not smaller than the number corresponding to the effective CP length, does not satisfy the multi-path delay judging condition.

Figure 16:
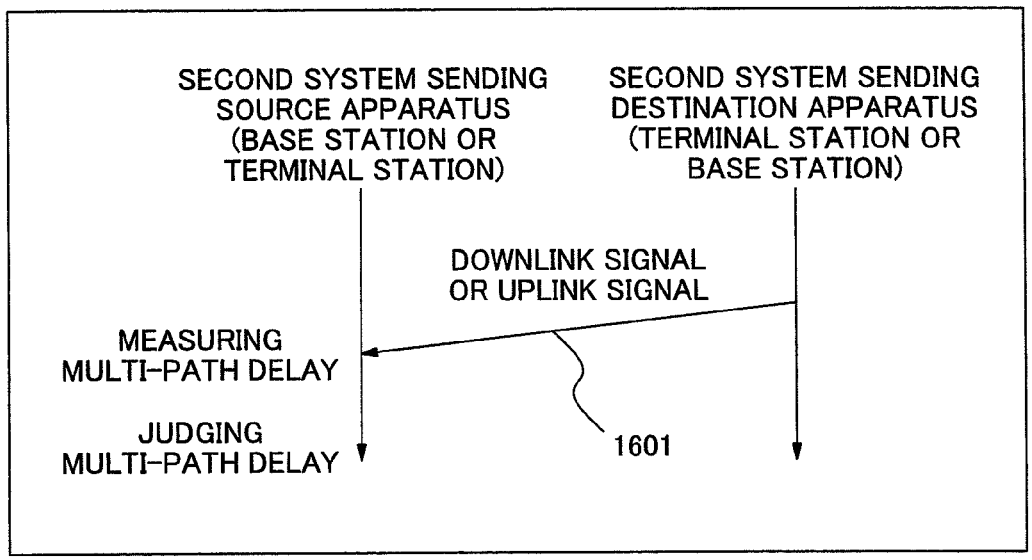
[FIG. 16] describes a procedure of measuring the multi-path delay of second system, and in particular.

FIG. 16 describes a procedure of measuring the multi-path delay of second system, and in particular, FIG. 16 is a sequence chart describing a procedure in which the sending source apparatus of the second system measures the multi-path delay of the second system. In the case that the sending source apparatus (for example, base station or terminal station) of the second system measures the multi-path delay of a transmission line 1601 whose signal direction is reverse to one of the transmission line to which the interference causing avoiding control is carried out, the measured multi-path delay can be handled as a reference value.

In addition to the procedure mentioned above, it is possible to estimate the multi-path delay on the basis of the distance between the sending source apparatus of the second system and the sending destination apparatus of the second system.

Figure 17:
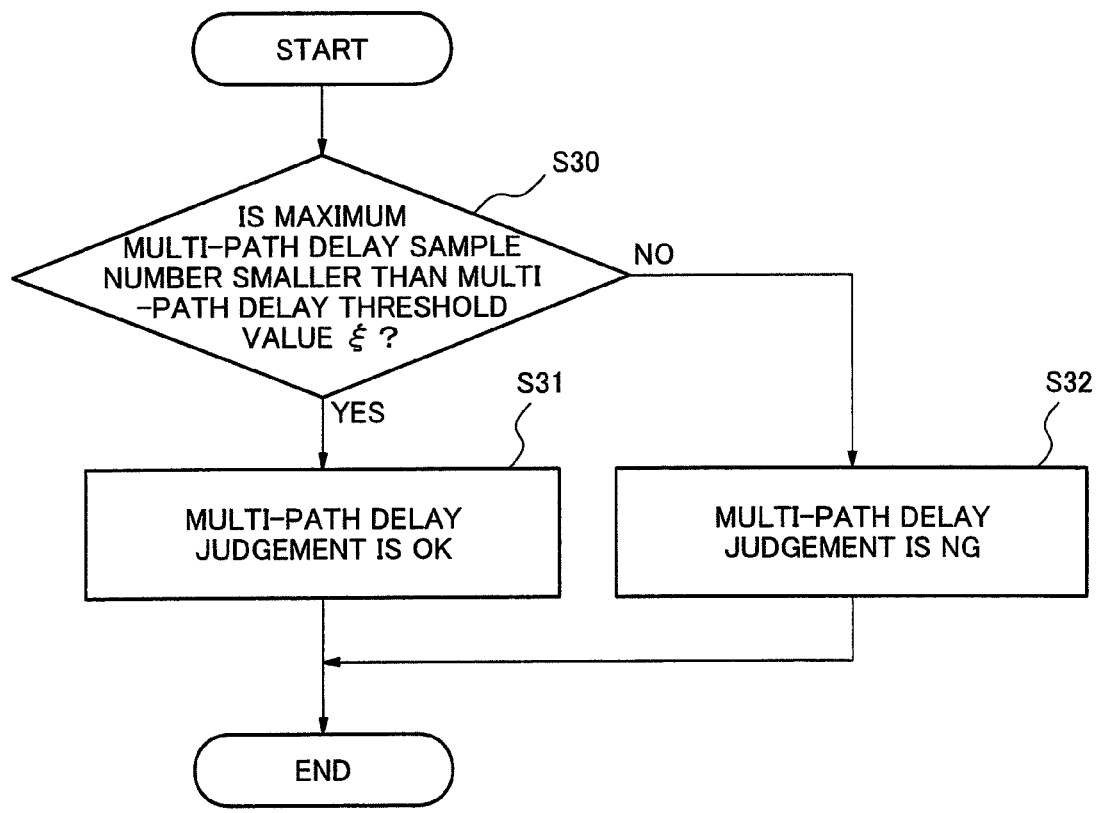
[FIG. 17] is a flowchart describing a detailed exemplary operation of a multi-path delay judging process shown in FIG. 11.

FIG. 17 is a flowchart showing a detailed exemplary operation of the multi-path delay judging process shown in FIG. 11 (specifically, process shown in Step S11). The multi-path delay judging part 604 (refer to FIG. 6) compares the maximum multi-path delay sample number with the multi-path delay threshold value ◘ (◘ is calculated, for example, by the formula (2)) (Step S30). In the case that the maximum multi-path delay sample number is smaller than the multi-path delay threshold value ◘ (Yes in Step S30), the multi-path delay judging part 604 judges that the multi-path delay judgement result is OK (Step S31). On the other hand, in the case that the maximum multi-path delay sample number is not smaller than the multi-path delay threshold value ◘ (No in Step S30), the multi-path delay judging part 604 judges that the multi-path delay judgement result is NG (Step S32).

Next, details of the process shown in FIG. 11 for carrying out the comprehensive judgement on the Time windowing/AIC on the basis of the interference causing avoiding judgment result and the multi-path delay judgement result (process shown in Step S12 which is carried out by the Time windowing/AIC comprehensive-judging part 605) will be described.

FIG. 18 is a schematic diagram showing a Time windowing/AIC changing comprehensive-judgement table based on the interference causing avoiding judgement result and the multi-path delay judgement result in relation to the process shown in FIG. 11 for carrying out the comprehensive judgement on the Time windowing/AIC. In the Time windowing/AIC changing comprehensive-judgement table, a pattern 1 shows an example that the AIC method is selected in the case that at least one out of two conditions for the judgement (that is, the interference causing avoiding judgement result and the multi-path delay judgement result) is not satisfied. Moreover, a pattern 4 shows an example that the AIC method is selected only in the case that two conditions are not satisfied. Moreover, a pattern 2 shows an example that to change the Time windowing method and the AIC method is carried out on the basis of only the interference causing avoiding judgement result. Meanwhile, a pattern 3 show an example that to change the Time windowing method and the AIC method is carried out on the basis of only the multi-path delay judgement result.

Figure 19:
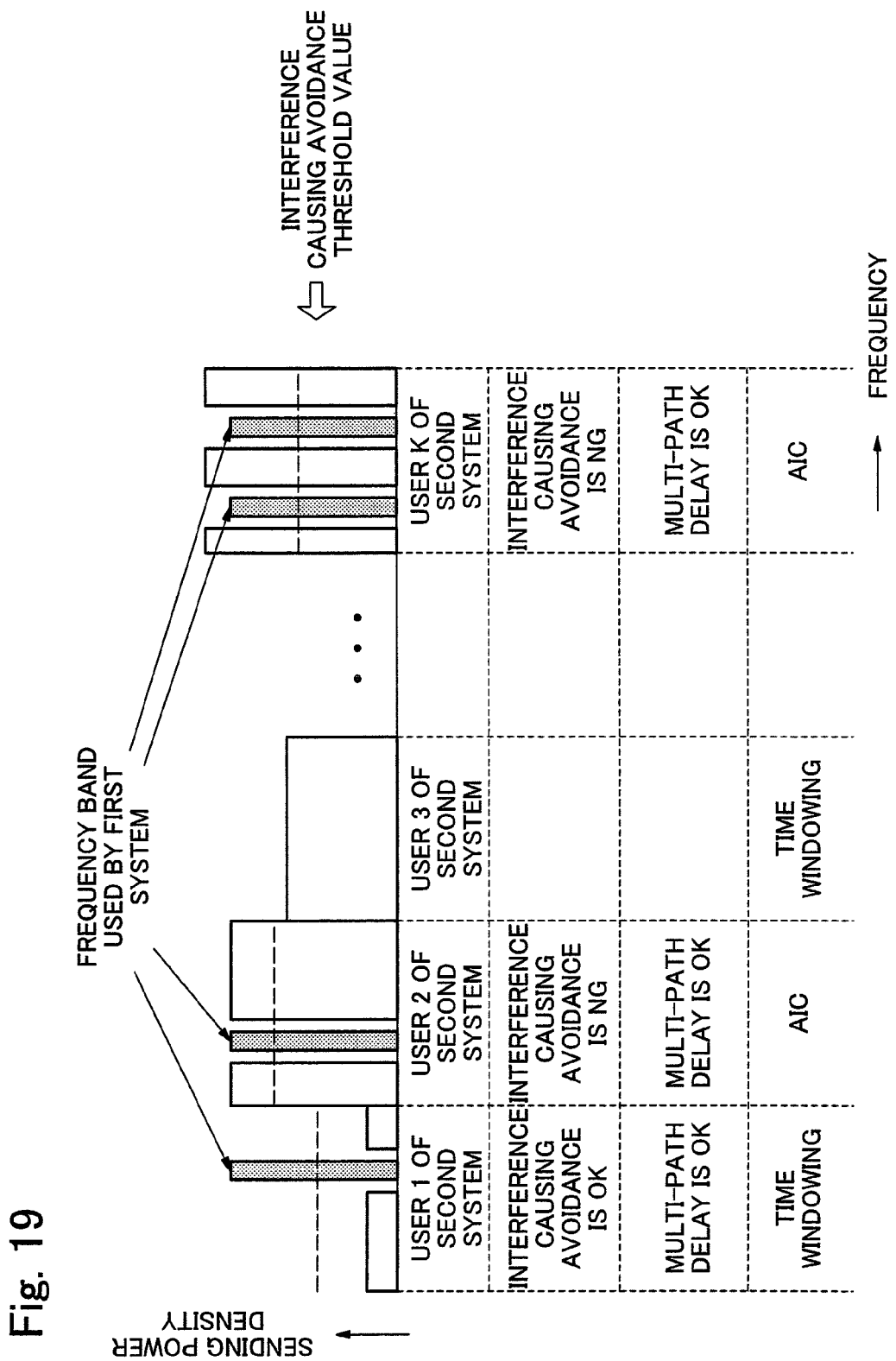
[FIG. 19] is a schematic diagram (graph) showing an image of Time windowing/AIC selection on the basis of the interference causing avoiding judgement result and the multi-path delay judgement result.

FIG. 19 is a schematic diagram (graph) showing an image of Time windowing/AIC selection on the basis of the interference causing avoiding judgement result and the multi-path delay judgement result. FIG. 19, whose horizontal axis indicates the frequency and the vertical axis indicates the sending power density, shows a state that the signals inputted by the user of the second system are multiplexed on the frequency axis. Moreover, as understood by FIG. 19, the notch is formed in the frequency band of the second system so that the frequency band of the second system may not overlap with one of the first system, and then the second system carries out the spectrum sending. Generally, as the sending power density of the second system becomes large, the power which leaks outside the frequency band also becomes large. As a result, the interference causing power becomes large. Contrarily, in the case that the sending power density is small, the power which leaks outside the frequency band also becomes small. As a result, the interference causing power becomes small.

The sending power density of each user of the second system, the interference causing avoiding judgement result (indicated by OK or NG), the multi-path delay judgement result (indicated by OK or NG) and the Time windowing/AIC changing comprehensive-judgement result (indicated by Time windowing or AIC) are shown in FIG. 19. In this case, the interference causing avoiding judgement and the multi-path delay judgement are carried out by use of the interference causing avoidance threshold value $◘_k$ which is set for each user. It is assumed that the sending signal is sent with changing the Time windowing method and the AIC method per the user on the basis of the judgement results. That is, regarding the interference causing avoiding judgement, FIG. 19 shows a case that, in the case that the sending power density of the second system is smaller than the interference causing avoiding threshold value $◘_k$ which is assigned to the user k, it is judged that the interference causing avoiding judging condition is satisfied (that is, OK), and in the case that the sending power density of the second system is not smaller than the interference causing avoidance threshold value $\square_k$, it is judged that the interference causing avoiding judging condition is not satisfied (that is, NG). Here, when focusing on the users 1, 2 and K, the user 1 satisfies both conditions of the interference causing avoiding judgement and the multi-path delay judgement, and the users 2 and K do not satisfy both conditions of the interference causing avoiding judgement and the multi-path delay judgement. Here, it is assumed, for example, that it is ruled that the Time windowing method is applied only when both conditions are satisfied, and the AIC method is applied when at least one condition is not satisfied. In this case, in the case of the pattern 1 in FIG. 18, the Time windowing method is applied to the user 1, and the AIC method is applied to the user 2 and the user K.

Figure 20:
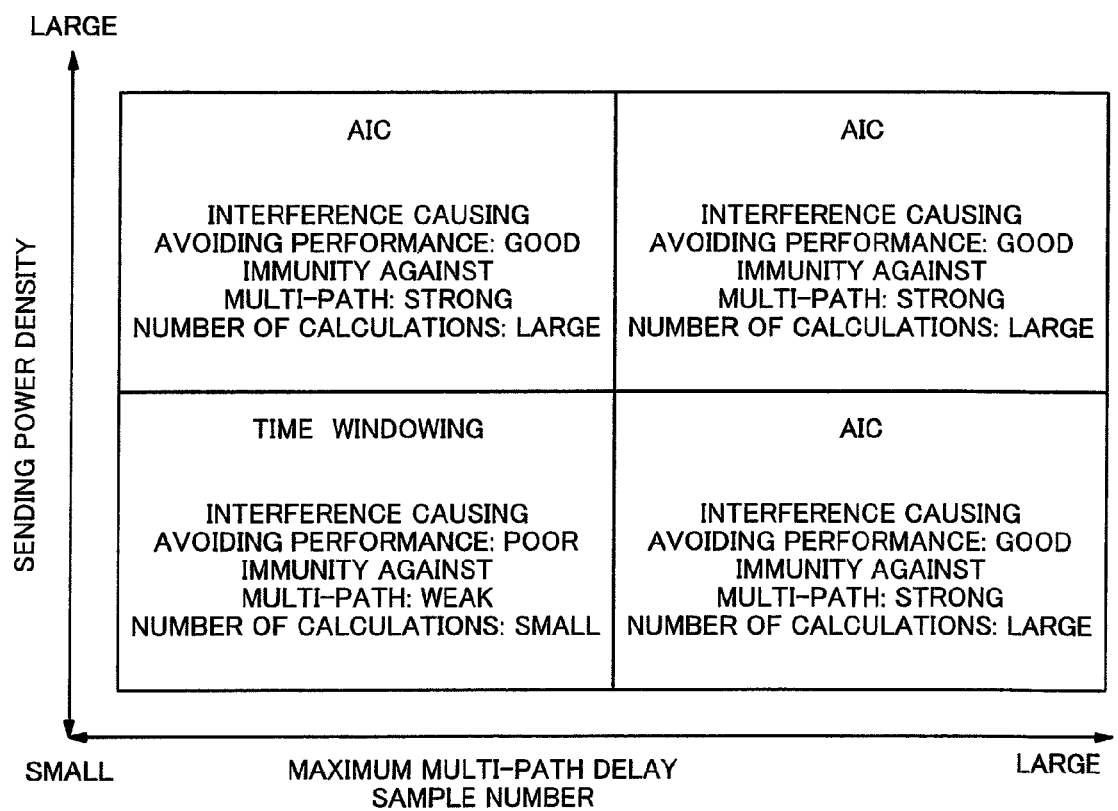
[FIG. 20] shows an example of a result of an operation for changing the Time windowing method and the AIC method on the basis of the sending power density and the maximum multi-path delay sample number.

FIG. 20 shows an example of a result of the operation of changing the Time windowing method and the AIC method on the basis of the sending power density and the maximum multi-path delay sample number. As understood by FIG. 20, the Time windowing method is applied to the user whose sending power density is sparse, and the maximum multi-path delay sample number is small. On the other hand, the AIC method is applied to the user whose sending power density is dense or the maximum multi-path delay sample number is large.

According to the second exemplary embodiment described above, it is possible to satisfy the interference causing avoiding performance which each user of the second system requires. Furthermore, it is possible to improve the transmission characteristic of some users. Here, it is necessary that the wireless sending apparatus according to the exemplary embodiment carries out another IFFT calculation in comparison with a wireless sending apparatus having a configuration to which only AIC method is applied. However, number of the calculations of the AIC method is very large in comparison with number of the calculations of IFFT. Here, in case of the wireless communication apparatus according to the exemplary embodiment, the AIC method is not always applied as mentioned above. The interference causing avoiding transmission method, which is processed in the time domain and whose interference causing avoiding performance is low but whose number of the calculations is small, may be applied in some cases if necessary. As a result, it is possible to reduce number of the calculations of the AIC method. In particular, in the case that number of the frequency bands in which the interference should be avoided from being caused is large, and consequently number of the calculations of the AIC method becomes large, an effect of reducing number of the calculations becomes remarkable according to the exemplary embodiment. That is, it is possible to reduce a whole of the calculations, which are required for avoiding the interference from being caused, through making the reduced number of the calculations of the AIC method exceed the increased number of the calculations of IFFT.

As a summary of the second exemplary embodiment, it is possible to optimize the interference causing avoiding performance, the transmission characteristic, and the number of the calculations required for avoiding the interference from being caused, which each frequency-domain group of the sending signal requires.

Furthermore, in the environment that the interference causing avoiding frequency band changes dynamically, it is possible to improve the tracking capability of the interference causing avoiding control.

[Third Exemplary Embodiment]

Figure 21:
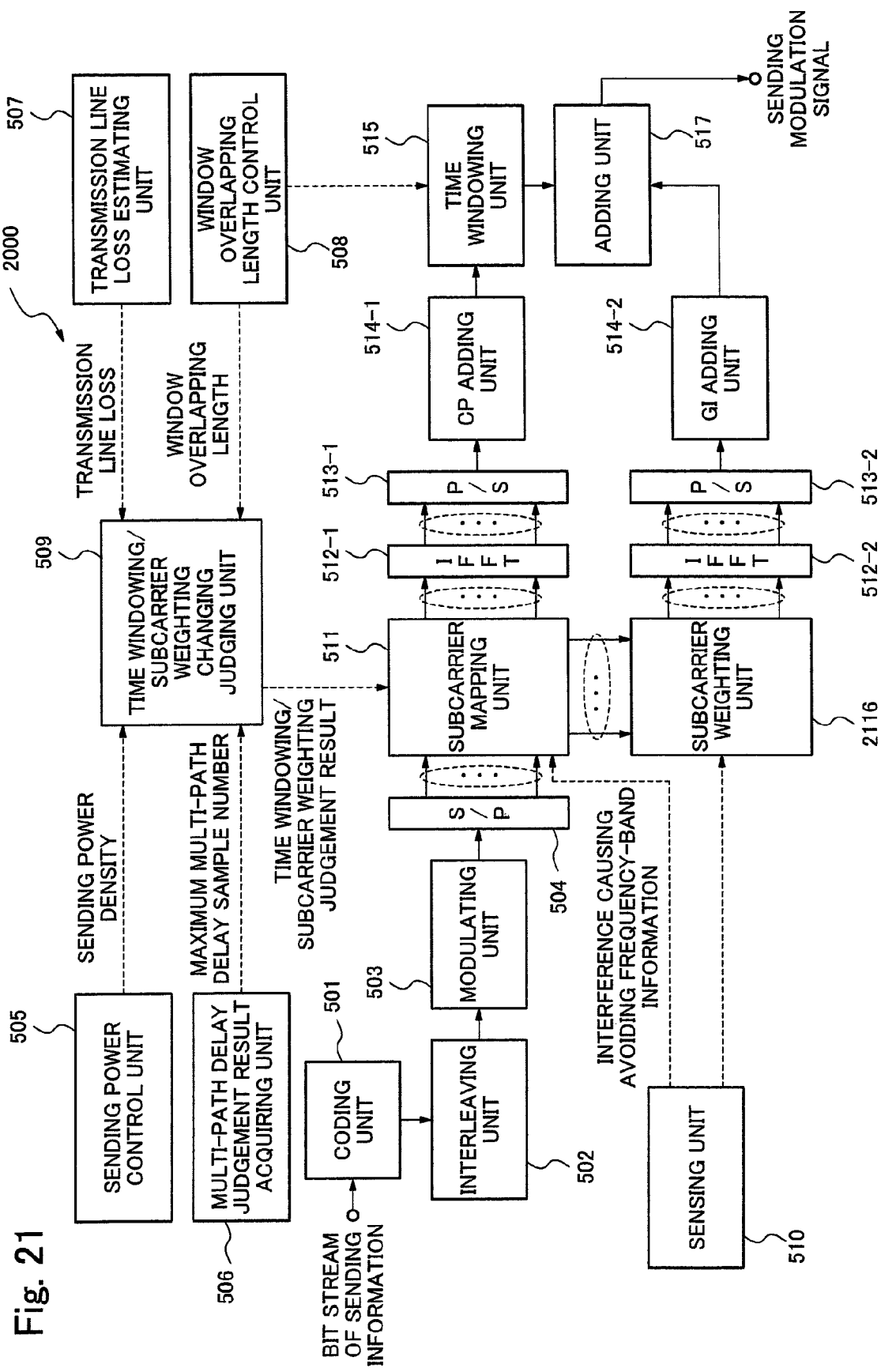
[FIG. 21] is a block diagram showing an exemplary configuration of a baseband unit, which is included in a wireless sending apparatus according to a third exemplary embodiment of the present invention and which is processed by the digital processing.
Figure 22:
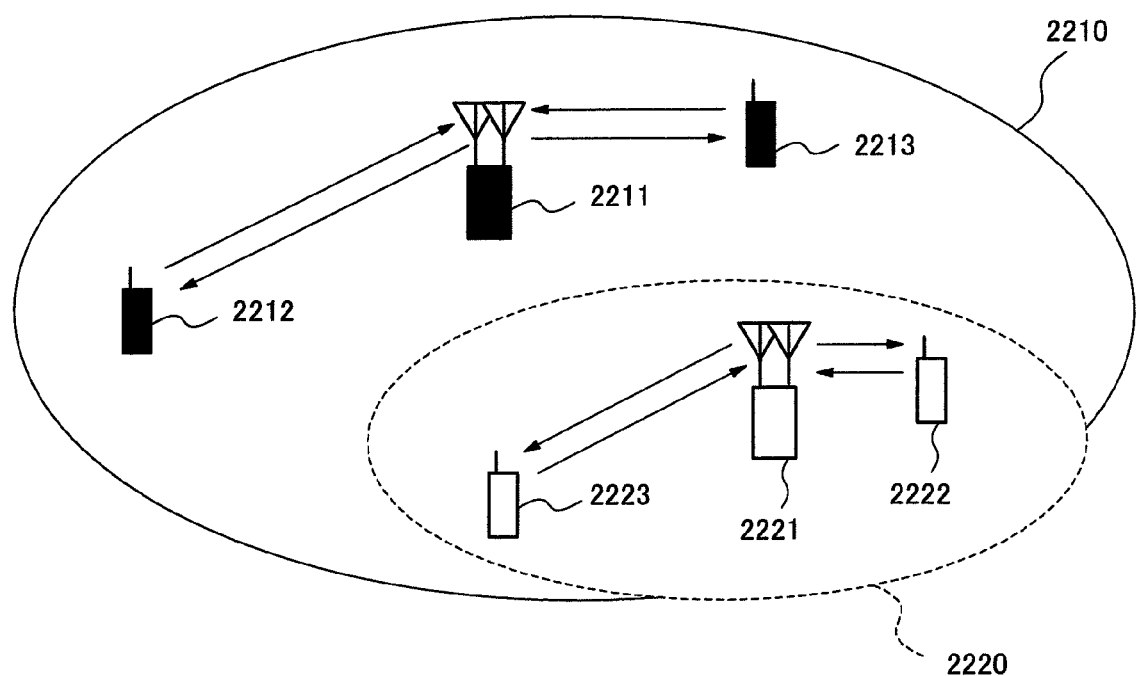
[FIG. 22] is a diagram describing a configuration of a general communication system in order to describe the dynamic spectral access.
Figure 23A:
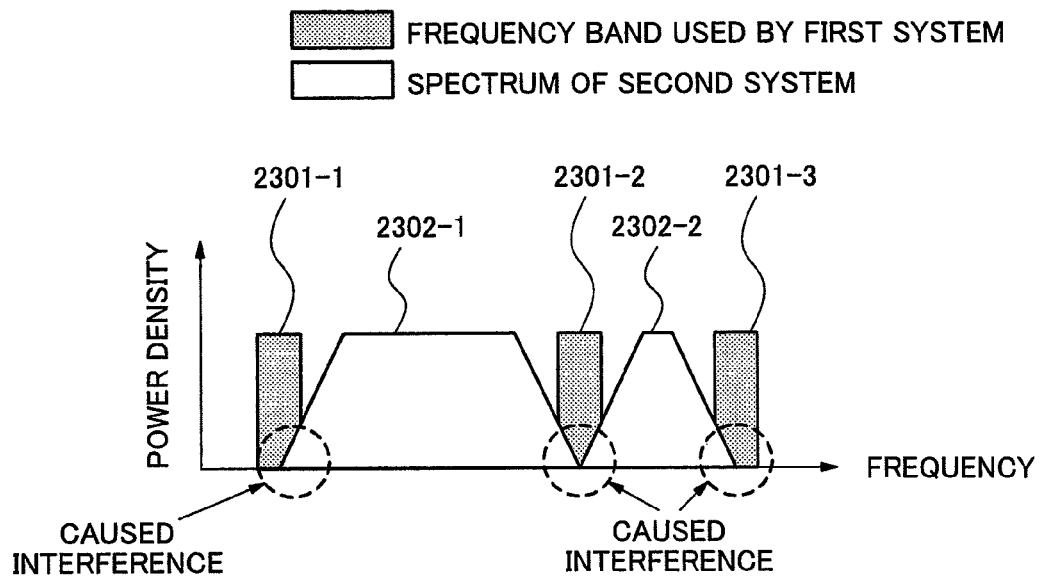
[FIG. 23A] is a schematic diagram describing a principle of a general interference causing avoiding transmission, and shows an image of a spectrum to which an interference causing avoiding technology has not been applied yet.
Figure 23B:
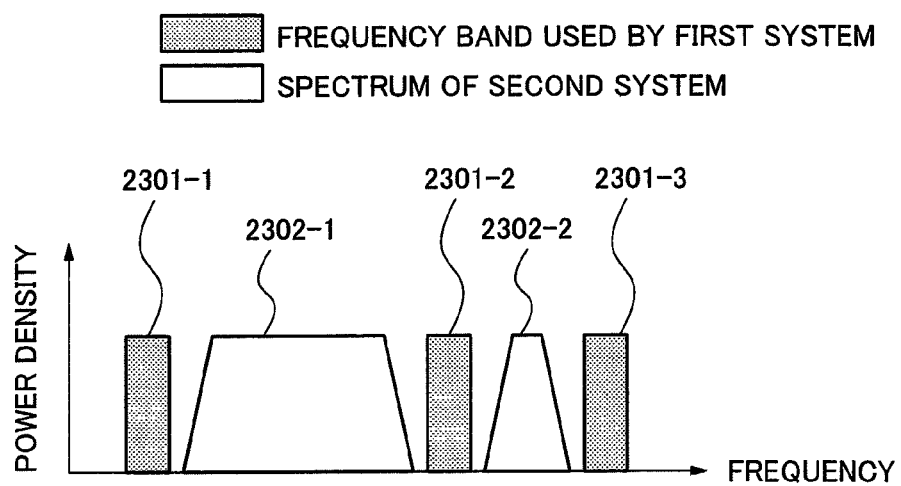
[FIG. 23B] is a schematic diagram describing a principle of the general interference causing avoiding transmission, and shows an image of a spectrum to which the interference causing avoiding technology has been applied.
Figure 24:
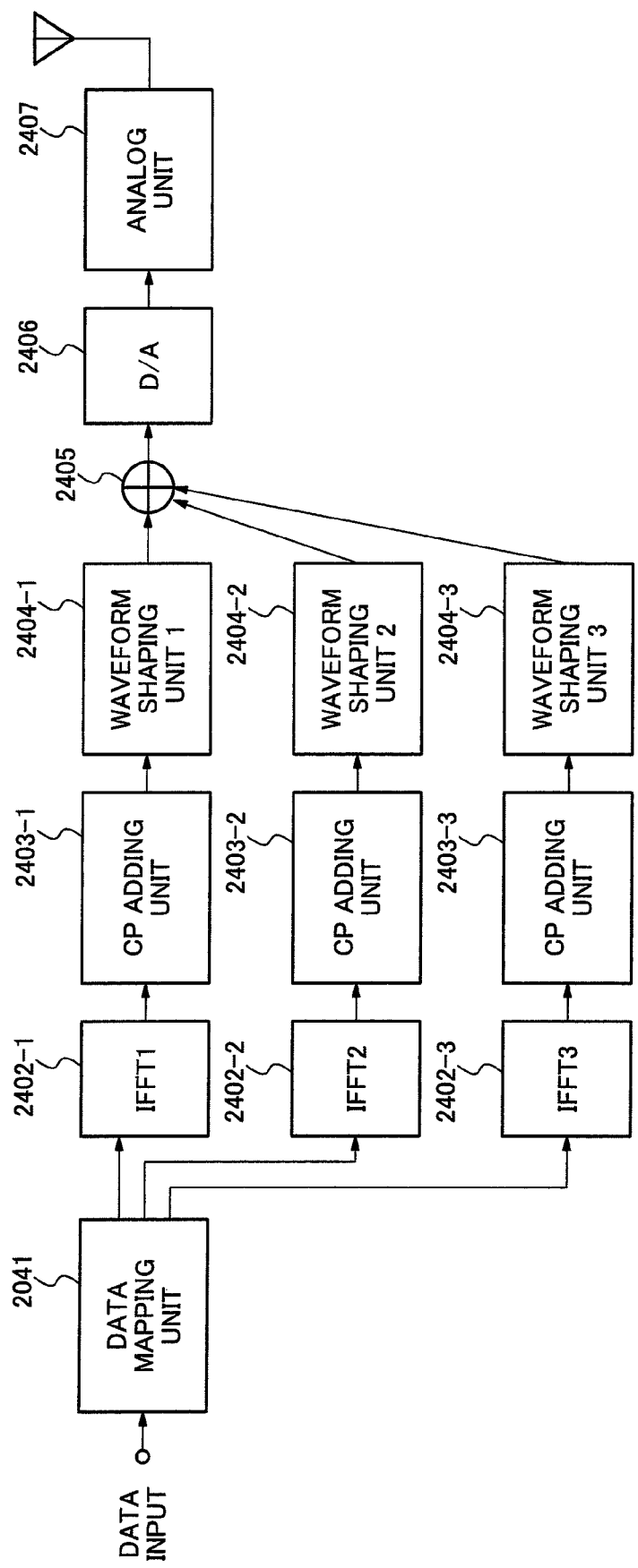
[FIG. 24] is a block diagram of a wireless sending apparatus which is disclosed in the patent document 1 and which reduces power existing outside the frequency band by use of the Time windowing method.
Figure 25:
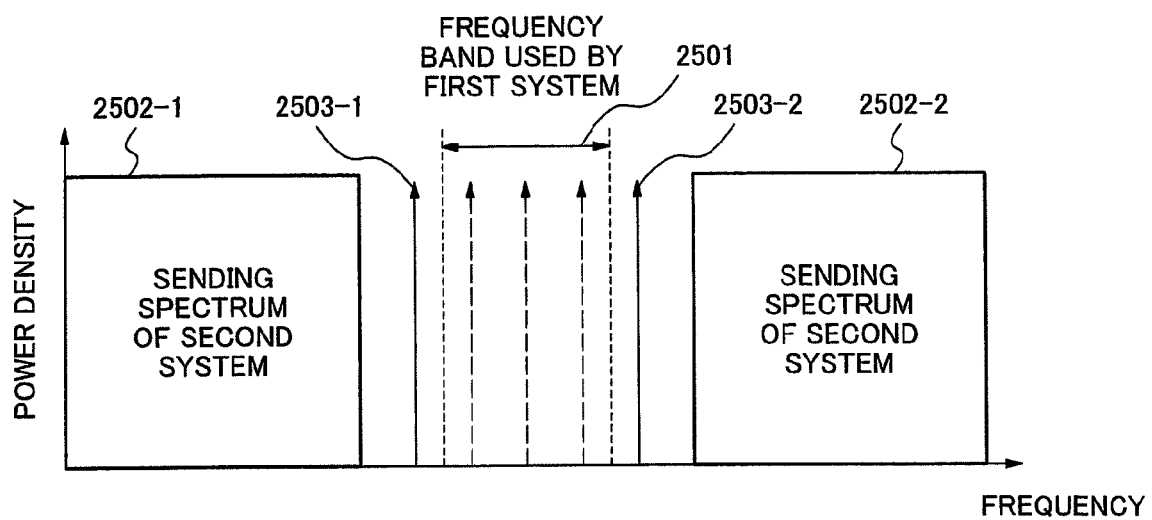
[FIG. 25] is a schematic diagram describing an operation of the AIC method which is disclosed in the non-patent documents 2 and 3.

FIG. 21 is a block diagram showing an exemplary configuration of a baseband unit 2000, which is included in a wireless sending apparatus according to a third exemplary embodiment of the present invention, and which is processed by the digital processing. A different point of the baseband unit 2000 from the baseband unit 500 according to the second exemplary embodiment shown in FIG. 5 is that the baseband unit 2000 uses the subcarrier weighting method instead of the AIC method as the interference causing avoiding transmission method which is processed in the frequency domain. Specifically, the baseband unit 2000 includes a Time windowing/subcarrier weighting changing judging unit 2109 instead of the Time windowing/AIC changing judging unit 509 shown in FIG. 5. Furthermore, the baseband unit 2000 includes a subcarrier weighting unit 2116 instead of the AIC symbol generating unit 516 shown in FIG. 5. According to the above-mentioned configuration, it is possible to carry out the interference causing avoiding transmission of the user's signal, to which the Time windowing method is not applied, by use of the subcarrier weighting method. According to the subcarrier weighting method, the leak power is reduced through multiplying a symbol, which is converted into the subcarrier signal, with an appropriate weighting so that a subcarrier component outside the frequency band may be small.

An operation of the baseband unit 2000 (that is, baseband unit which is included in the wireless sending apparatus according to the third exemplary embodiment) is identical to the operation described in the flowchart shown in FIG. 21 (flowchart which describes the exemplary operation of the baseband unit included in the wireless sending apparatus according to the second exemplary embodiment of the present invention) in which "AIC" is placed by "subcarrier weighting". Specifically, "AIC" described in Steps S12 and S13 in FIG. 11 is placed by "subcarrier weighting".

In the case that the subcarrier weighting method is applied, there is an advantage that it is unnecessary to insert the dedicated symbol, which the AIC method uses, for reducing the leak power.

[Modified Exemplary Embodiment]

It may be preferable that a spectrum coding unit to make the symbols, which are converted into the subcarrier signal, correlated each other is arranged in place of the AIC symbol generating unit 516 shown in FIG. 5 in order to suppress the power which leaks outside the frequency band.

Moreover, the interference causing avoiding transmission method which is processed in the time domain is not limited to the Time windowing method. It is possible to adopt another method. Moreover, the interference causing avoiding transmission method which is processed in the frequency domain is not limited to the AIC method and the subcarrier weighting method. It is possible to adopt another method.

Moreover, while the case that the sending power density, the maximum multi-path delay sample number, the transmission line loss between the sending apparatus and the first system receiving apparatus, and the Window overlapping length are used as the change judging information is exemplified in the above mentioned description, it is also possible to use another information as the change judging information. For example, it is possible to use a distance in the frequency domain from the interference causing avoiding frequency band as the change judging information. In this case, the AIC method is applied to an user whose signal in the frequency domain is near to the interference causing avoiding frequency band, and the Time windowing method is applied to an user whose signal in the frequency domain is far from the interference causing avoiding frequency band.

Moreover, while the case that judging whether changing the interference causing avoiding means, and changing the interference causing avoiding means are carried out per the user is exemplified in the above-mentioned description, the present invention is not limited to the case of carrying out the judgement and the change per the user. It is possible to carry out the judgement and the change, for example, per a RB (Resource Block) unit or per the subcarrier.

Here, the resource block indicates a change unit of communication, and may be called a subchannel, a subcarrier block, a subband or a chunk in some cases. Furthermore, the resource block may include the continuous subcarriers or the non-continuous subcarriers. For example, the resource block is defined as seven or six continuous OFDM symbols in the time domain on the basis of the cyclic prefix, and twelve continuous subcarriers in the frequency domain.

Moreover, while the case that the interference causing avoiding transmission is realized with carrying out always both the Time windowing process and the AIC process is exemplified in the above-mentioned description, the present invention is not limited to the case. For example, it is also possible that, in the case that number of the interference causing avoiding frequency bands is small, the interference causing avoiding transmission is realized with stopping the Time windowing process and carrying out only the AIC process, and only in the case that the number of the interference causing avoiding frequency bands is large, the interference causing avoiding transmission is realized with carrying out both the Time windowing process and the AIC process.

Moreover, while the wireless sending apparatus based on the OFDM multi-carrier transmission method is exemplified in the above-mentioned description, it is possible to apply the configurations according to the first to the third exemplary embodiments to the DFT (Discrete Fourier Transform)-Spread OFDM of the single carrier transmission.

Moreover, while the case that the configurations described in the first to the third exemplary embodiments are applied to the second system is exemplified, it may be preferable that the configurations described in the first to the third exemplary embodiments are applied to the first system.

Moreover, the first to the third exemplary embodiments described above can be realized by predetermined hardware, for example, by a circuit.

Moreover, it is possible that the configurations of the first to the third embodiments described above are controlled and operated by a computer circuit (for example, CPU (Central Processing Unit)), which is not shown in the figure, on the basis of a control program. In the case, these control programs are stored in a storage medium of the wireless sending apparatus or the baseband unit, or an external storage medium. Then, these control programs are read and executed by the above-mentioned computer circuit. As the storage medium of the wireless sending apparatus or the baseband unit, ROM (Read Only Memory), a hard disk or the like is exemplified. As the external storage medium, a removable storage medium, a removable disk or the like is exemplified While the invention related to the present application has been described with reference to the exemplary embodiment, the invention related to the present application is not limited to the above-mentioned exemplary embodiment. It is possible to make various changes, which a person skilled in the art can understand, in the form and details of the invention related to the present application without departing from the sprit and scope of the present invention.

This application is based upon and claims the benefit of priority from Japanese Patent Application No. 2009-255828, filed on Nov. 9, 2010, the disclosure of which is incorporated herein in its entirety by reference.

Description of Codes

100 Baseband unit
101 Modulating unit
102 Change judging unit
103 Signal separating unit
104 Interference causing avoiding transmission unit which is processed in the time domain
105 Interference causing avoiding transmission unit which is processed in the frequency domain
106 Synthesizing unit
500 Baseband unit
501 Encoding unit
502 Interleaving unit
503 Modulating unit
504 S/P conversion unit
505 Sending power control unit
506 Multi-path delay measurement result acquiring unit
507 Transmission line loss estimating unit
508 Window overlapping length control unit
509 Time windowing/AIC changing judging unit
510 Sensing unit
511 Subcarrier mapping unit
512-1 and 512-2 IFFT unit
513-1 and 513-2 P/S conversion unit
514-1 CP adding unit
514-2 GI adding unit
515 Time windowing unit
516 AIC symbol generating unit
517 Adding unit
601 Interference causing avoidance threshold value determining part
602 Interference causing avoiding judging part
603 Multi-path delay threshold value determining part
604 Multi-path delay judging part
605 Time windowing/AIC comprehensive-judging part
701 Tail portion copying part
702 Time-domain waveform shaping part
703 Preceding and following OFDM symbol overlapping part
801 Head window
802 OFDM symbol
803 Tail window
901 AIC coefficient generating part
902 AIC coefficient multiplying part
903 AIC symbol inserting part
1401 Downlink or uplink signal
1402 Multi-path delay measuring information
1601 Uplink or downlink signal
2000 Baseband unit
2109 Time windowing/subcarrier weighting changing judging unit
2116 Subcarrier weighting unit

The invention claimed is:

1. A wireless sending apparatus, comprising:
a change judging means to judge whether changing an interference causing avoiding transmission means, which is applied to each predetermined frequency-domain group of a sending signal, on the basis of predetermined change judging information, and to output a judgment as a change judgment result;
a signal separating means to separate the sending signal into each the group on the basis of the change judgment result;

a first interference causing avoiding transmission means to input the sending signal which is separated into each the group, and to reduce leak power, which leaks outside a sending frequency band, by a time-domain process;

a second interference causing avoiding transmission means to input the sending signal which is separated into each the group, and to reduce the leak power, which leaks outside the sending frequency band, by a frequency-domain process; and a synthesizing means to synthesize the sending signals which the first interference causing avoiding transmission means and the second interference causing avoiding transmission means carry out an interference causing avoiding process to respectively and supply respectively, wherein the sending signal is sent per the group by use of any one of the first interference causing avoiding transmission means and the second interference causing avoiding transmission means.

2. The wireless sending apparatus according to claim 1, wherein the change judging means judges per a group, which is composed of a subcarrier, whether changing the first interference causing avoiding transmission means and the second interference causing avoiding transmission means, wherein the first interference causing avoiding transmission means includes a symbol waveform shaping means which shapes a waveform of a symbol in the time domain, and wherein the second interference causing avoiding transmission means includes a leak power suppressing signal generating means to generate a signal for suppressing the leak power, which leaks outside the sending frequency band, up to a required level.

3. The wireless sending apparatus according to claim 1, wherein the change judging information is any one or both of interference causing avoiding requiring information and transmission line multi-path delay information which are needed, and wherein the change judging means carries out the judgment on the change on the basis of any one or both of the interference causing avoiding requiring information and the transmission line multi-path delay information.

4. The wireless sending apparatus according to claim 3, wherein the change judging means, comprising:

an interference causing avoidance threshold value determining means to determine a threshold value for identifying a permissible caused interference on the basis of transmission line loss between the wireless sending apparatus and a receiving apparatus in which the interference should be avoided from being caused;

an interference causing avoiding judging means to carry out an interference causing avoiding judgment through comparing the interference causing avoiding requiring information with the interference causing avoidance threshold value, and outputs the judgment as an interference causing avoiding judgment result;

a multi-path delay threshold value determining means to determine a threshold value for identifying a permissible multi-path delay on the basis of a length of the symbol waveform which is shaped by the first interference causing avoiding transmission means;

a multi-path delay judging means to carry out a multi-path delay judgment through comparing the multi-path delay information with the multi-path delay threshold value, and to output the judgment as a multi-path delay judgment result; and a symbol waveform shaping means/leak power suppressing signal generating means changing judging means to judge any one out of the symbol waveform shaping means and the leak power suppressing signal generating means on the basis of any one or both of the interference causing avoiding judgment result and the multi-path delay judgment result.

5. The wireless sending apparatus according to claim 2, wherein the symbol waveform shaping means, comprising:

an inverse Fourier transformation means to input the sending signal which is separated into each the group including the subcarrier and which is provided by the signal separating means, and to generate a subcarrier signal;

a parallel/serial conversion means to input the subcarrier signal which is provided by the inverse Fourier transformation means, and to carry out the parallel/serial conversion to the inputted subcarrier signal;

a cyclic prefix adding means to input the signal which is provided by the parallel/serial conversion unit, and to add a cyclic prefix to the inputted signal; and a symbol' both sides waveform shaping means to input the signal which is provided by the cyclic prefix adding unit and to which the cyclic prefix is added, and to shape a waveform of both sides of the symbol in the time domain.

6. The wireless sending apparatus according to claim 2, wherein the leak power suppressing signal generating means, comprising:

an interference causing avoiding symbol generating means to input interference causing avoiding frequency-band information indicating a frequency band which avoids the interference from being caused, and the sending signal which is separated into each the group and is provided by the signal separating unit, and to insert a symbol, which suppresses the leak power leaking into the frequency band in which the interference should be avoided from being caused, into the sending signal;

an inverse Fourier transformation means to input the sending signal which is provided by the interference causing avoiding symbol generating means, and to generate a subcarrier signal;

a parallel/serial conversion means to input the subcarrier signal, which is provided by the inverse Fourier transformation means, and to carry out the parallel/serial conversion to the inputted subcarrier signal; and a guard interval adding means to input the signal which is provided by the parallel/serial conversion unit, and to add a guard interval to the inputted signal.

7. The wireless sending apparatus according to claim 2, wherein the group is set so as to be composed of the subcarrier per an user.

8. The wireless sending apparatus according to claim 2, wherein the group is set so as to be composed of the subcarrier per a resource block.

9. The wireless sending apparatus according to claim 3, wherein the interference causing avoiding requiring information is power density of the sending signal, and wherein the change judging means carries out the judgment on the change with reference to the sending power density.

10. The wireless sending apparatus according to claim 3, wherein
the interference causing avoiding requiring information is a distance in the frequency domain from the frequency band in which the interference should be avoided from being caused, and wherein
the change judging means carries out the judgment on the change with reference to the distance in the frequency domain from the frequency band in which the interference should be avoided from being caused.

11. The wireless sending apparatus according to claim 3, wherein
the multi-path delay information is maximum multi-path delay sample number, which is reported by a sending destination apparatus, of a transmission line to which the interference causing avoiding transmission means is applied, and wherein
the change judging means carries out the judgment on the change with reference to the maximum multi-path delay sample number which is reported by the sending destination apparatus.

12. The wireless sending apparatus according to claim 3, wherein
the multi-path delay information is the maximum multi-path delay sample number of a transmission line whose signal direction is reverse to one of the transmission line applying the interference causing avoiding transmission means, and wherein
the change judging means carries out the judgment on the change with reference to the maximum multi-path delay sample number.

13. The wireless sending apparatus according to claim 1, wherein
the interference causing avoiding transmission means stops the process, which is carried out by the first interference causing avoiding transmission means, on the basis of number of the frequency bands in which the interference should be avoided from being caused, and carries out the interference causing avoiding transmission with only the process carried out by the second interference causing avoiding transmission means.

14. A wireless sending method, comprising:
a change judging step to judge whether changing an interference causing avoiding transmission step, which is applied to each predetermined frequency-domain group of a sending signal, on the basis of predetermined change judging information, and to output a judgment as a change judgment result;
a separating step to separate the sending signal into each the group on the basis of the change judgment result;
a first interference causing avoiding transmission step to input the sending signal which is separated into each the group, and to reduce leak power, which leaks outside a sending frequency band, by a time-domain process;
a second interference causing avoiding transmission step to input the sending signal which is separated into each the group, and to reduce the leak power, which leaks outside the sending frequency band, by a frequency-domain process; and
a synthesizing step to synthesize the sending signals which the first interference causing avoiding transmission step and the second interference causing avoiding transmission step carry out an interference causing avoiding process to respectively and supply respectively, wherein the sending signal is sent per the group by use of any one of the first interference causing avoiding transmission step and the second interference causing avoiding transmission step.

15. The wireless sending method according to claim 14, wherein
the change judging step includes a step to judge per a group, which is composed of a subcarrier, whether changing the first interference causing avoiding transmission step and the second interference causing avoiding transmission step, wherein
the first interference causing avoiding transmission step includes a step to shape a waveform of a symbol in the time domain, and wherein
the second interference causing avoiding transmission step includes a step to generate a signal for suppressing the leak power, which leaks outside the sending frequency band, up to a required level.

16. The wireless sending method according to claim 14, wherein
the change judging information is any one or both of interference causing avoiding requiring information and transmission line multi-path delay information which are needed, and wherein
the change judging step carries out the judgment on the change on the basis of any one or both of the interference causing avoiding requiring information and the transmission line multi-path delay information.

17. The wireless sending method according to claim 16, wherein
the change judging step, comprising:
an interference causing avoidance threshold value determining step to determine a threshold value for identifying a permissible caused interference on the basis of transmission line loss between the wireless sending apparatus and a receiving apparatus in which the interference should be avoided from being caused;
an interference causing avoiding judging step to carry out an interference causing avoiding judgment through comparing the interference causing avoiding requiring information with the interference causing avoidance threshold value, and outputs the judgment as an interference causing avoiding judgment result;
a multi-path delay threshold value determining step to determine a threshold value for identifying a permissible multi-path delay on the basis of a length of the symbol waveform which is shaped in the first interference causing avoiding transmission step;
a multi-path delay judging step to carry out a multi-path delay judgment through comparing the multi-path delay information with the multi-path delay threshold value, and to output the judgment as a multi-path delay judgment result; and
a symbol waveform shaping step/leak power suppressing signal generating step changing judging step to judge any one out of the symbol waveform shaping step and the leak power suppressing signal generating step on the basis of any one or both of the interference causing avoiding judgment result and the multi-path delay judgment result.

18. A non-transitory computer-readable medium embodying instructions for controlling a computer of a wireless sending apparatus to execute:
a change judging process to judge whether changing an interference causing avoiding transmission process, which is applied to each predetermined frequency-domain group of a sending signal, on the basis of predetermined change judging information, and to output a judgment as a change judgment result;
a separating process to separate the sending signal into each the group on the basis of the change judgment result;
a first interference causing avoiding transmission process to input the sending signal which is separated into each the group, and to reduce leak power, which leaks outside a sending frequency band, by a time-domain process;
a second interference causing avoiding transmission process to input the sending signal which is separated into each the group, and to reduce the leak power, which leaks outside the sending frequency band, by a frequency-domain process;
a synthesizing process to synthesize the sending signals to which the first interference causing avoiding process and the second interference avoiding process are carried out respectively; and
a sending process to send the sending signal per the group by use of any one of the first interference avoiding transmission process and the second interference avoiding transmission process.

19. A baseband circuit, comprising:
a change judging circuit to judge whether changing an interference causing avoiding transmission circuit, which is applied to each predetermined frequency-domain group of a sending signal, on the basis of predetermined change judging information, and to output a judgment as a change judgment result;
a signal separating circuit to separate the sending signal into each the group on the basis of the change judgment result;
a first interference causing avoiding transmission circuit to input the sending signal which is separated into each the group, and to reduce leak power, which leaks outside a sending frequency band, by a time-domain process;
a second interference causing avoiding transmission circuit to input the sending signal which is separated into each the group, and to reduce the leak power, which leaks outside the sending frequency band, by a frequency-domain process; and
a synthesizing circuit to synthesize the sending signals which the first interference causing avoiding transmission circuit and the second interference causing avoiding transmission circuit carry out an interference causing avoiding process to respectively and supply respectively, wherein
the sending signal is sent per the group by use of any one of the first interference causing avoiding transmission circuit and the second interference causing avoiding transmission circuit.

* * * * *

UNITED STATES PATENT AND TRADEMARK OFFICE
CERTIFICATE OF CORRECTION

PATENT NO. : 8,908,794 B2
APPLICATION NO. : 13/508688
DATED : December 9, 2014
INVENTOR(S) : Yasunori Futatsugi and Masayuki Ariyoshi It is certified that error appears in the above-identified patent and that said Letters Patent is hereby corrected as shown below:

In the Specification

Column 18, Line 18: Delete "$M(N_i 31\ 1)+1$" and insert -- $M(N_i-1)+1$ --

Column 18, Line 38: Delete "$P_l$" and insert -- $P_1$ --

Signed and Sealed this
Thirtieth Day of June, 2015

Michelle K. Lee
*Director of the United States Patent and Trademark Office*